(12) United States Patent  
Kiely et al.

(10) Patent No.: US 7,214,890 B2  
(45) Date of Patent: May 8, 2007

(54) ELECTRICAL CONNECTOR HAVING AN OUTLET END ANGULARLY DISPOSED RELATIVE AN INLET END WITH OUTER RETAINER RING ABOUT THE OUTLET END AND INTERNAL UNIDIRECTIONAL CONDUCTOR RETAINER IN THE INLET END

(75) Inventors: Kenneth M. Kiely, Milford, CT (US); Delbert Auray, Southport, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 11/545,640

(22) Filed: Oct. 10, 2006

(65) Prior Publication Data

US 2007/0045004 A1   Mar. 1, 2007

Related U.S. Application Data

(63) Continuation-in-part of application No. 11/501,131, filed on Aug. 8, 2006, which is a continuation-in-part of application No. 11/403,099, filed on Apr. 12, 2006, now Pat. No. 7,151,223, which is a continuation-in-part of application No. 11/400,606, filed on Apr. 7, 2006, now Pat. No. 7,154,042, which is a continuation-in-part of application No. 11/364,435, filed on Feb. 28, 2006, which is a continuation-in-part of application No. 11/258,990, filed on Oct. 26, 2005, now Pat. No. 7,057,107, which is a continuation-in-part of application No. 11/151,374, filed on Jun. 13, 2005, now Pat. No. 7,075,007, which is a continuation-in-part of application No. 11/100,250, filed on Apr. 6, 2005, now Pat. No. 7,064,272, which is a continuation-in-part of application No. 10/939,619, filed on Sep. 13, 2004, now Pat. No. 6,916,988.

(51) Int. Cl.  
*H02G 3/06* (2006.01)

(52) U.S. Cl. ............... 174/666; 174/659; 174/663; 439/557

(58) Field of Classification Search ........ 174/657–665, 174/153 R, 71 R, 84 R, 68.1, 68.3, 70 R; 439/142, 557, 552  
See application file for complete search history.

(56) References Cited

U.S. PATENT DOCUMENTS 1,483,218 A   2/1924   Fahnestock (Continued)

*Primary Examiner*—Dhiru R. Patel  
(74) *Attorney, Agent, or Firm*—Fattibene & Fattibene; Arthur T. Fattibene; Paul A. Fattibene

(57) ABSTRACT

This disclosure is directed to electrical connectors that include a connector body having an inlet end portion and an outlet end portion and a bore extending therethrough, wherein the outlet end portion is provided with an outer surface that slopes downwardly toward the outlet opening and having a complementary sloping or frustro-conical retaining ring having locking tangs and grounding tangs for snap locking the outlet end portion to an electric box or enclosure, and a wire retainer fitted to the inlet end portion for receiving and securing a wire conductor thereto. The connector body may take several forms including a form wherein the inlet opening is angularly disposed relative to the outlet opening, with the inlet opening being formed to be press fitted onto a flexible conduit.

9 Claims, 29 Drawing Sheets

U.S. PATENT DOCUMENTS

| | | |
|---|---|---|
| 1,725,883 A | 8/1929 | Recker |
| 1,830,250 A | 11/1931 | Tiefenbacher |
| 2,156,003 A | 4/1939 | Tinnerman |
| 2,160,353 A | 5/1939 | Conners |
| 2,445,663 A | 7/1948 | Peters |
| 2,744,769 A | 5/1956 | Roeder et al. |
| 2,823,932 A | 2/1958 | Schigut |
| 3,183,297 A | 5/1965 | Curtiss |
| 3,436,105 A | 4/1969 | Miklya |
| 3,544,705 A | 12/1970 | Winston |
| 3,631,738 A | 1/1972 | Harper |
| 3,788,582 A | 1/1974 | Swanquist |
| 3,814,467 A | 6/1974 | Van Buren, Jr. |
| 3,858,151 A | 12/1974 | Paskert |
| 3,993,333 A | 11/1976 | Biswas |
| 4,012,578 A | 3/1977 | Moran et al. |
| 4,021,604 A | 5/1977 | Dola et al. |
| 4,032,178 A | 6/1977 | Neuroth |
| 4,248,459 A | 2/1981 | Pate et al. |
| 4,361,302 A | 11/1982 | Lass |
| 4,468,535 A | 8/1984 | Law |
| 4,619,332 A | 10/1986 | Sheehan |
| 4,621,166 A | 11/1986 | Neuroth |
| 4,626,620 A | 12/1986 | Plyler |
| 4,657,212 A | 4/1987 | Gilmore et al. |
| 4,711,472 A | 12/1987 | Schnell |
| 4,773,280 A | 9/1988 | Baumgarten |
| 4,880,387 A | 11/1989 | Stikeleather et al. |
| 4,981,310 A | 1/1991 | Belisaire |
| 4,990,721 A | 2/1991 | Sheehan |
| 5,132,493 A | 7/1992 | Sheehan |
| 5,171,164 A | 12/1992 | O'Neil et al. |
| 5,189,258 A | 2/1993 | Pratesi |
| 5,266,050 A | 11/1993 | O'Neil et al. |
| 5,342,994 A | 8/1994 | Pratesi |
| 5,422,437 A | 6/1995 | Schnell |
| 6,034,326 A | 3/2000 | Jorgensen |
| 6,043,432 A | 3/2000 | Gretz |
| 6,080,933 A | 6/2000 | Gretz |
| 6,114,630 A | 9/2000 | Gretz |
| 6,133,529 A | 10/2000 | Gretz |
| 6,162,071 A * | 12/2000 | Muller ............... 439/142 |
| 6,194,661 B1 | 2/2001 | Gretz |
| 6,215,069 B1 * | 4/2001 | Martin et al. ............ 174/68.3 |
| 6,335,488 B1 | 1/2002 | Gretz |
| 6,352,439 B1 | 3/2002 | Stark et al. |
| 6,355,884 B1 | 3/2002 | Gretz |
| 6,380,483 B1 | 4/2002 | Blake |
| 6,444,907 B1 | 9/2002 | Kiely |
| 6,476,322 B1 | 11/2002 | Dunne et al. |
| 6,521,831 B1 | 2/2003 | Gretz |
| 6,555,750 B2 | 4/2003 | Kiely |
| 6,604,400 B1 | 8/2003 | Gretz |
| 6,670,553 B1 | 12/2003 | Gretz |
| 6,682,355 B1 | 1/2004 | Gretz |
| 6,737,584 B2 | 5/2004 | Kiely |
| 6,768,057 B2 | 7/2004 | Blake |
| 6,780,029 B1 | 8/2004 | Gretz |
| 6,849,803 B1 | 2/2005 | Gretz |
| 6,860,758 B1 | 3/2005 | Kiely |
| 6,872,886 B2 | 3/2005 | Keily |
| 6,916,988 B1 | 7/2005 | Auray et al. |
| 6,935,891 B2 * | 8/2005 | Kiely ............... 439/557 |

* cited by examiner

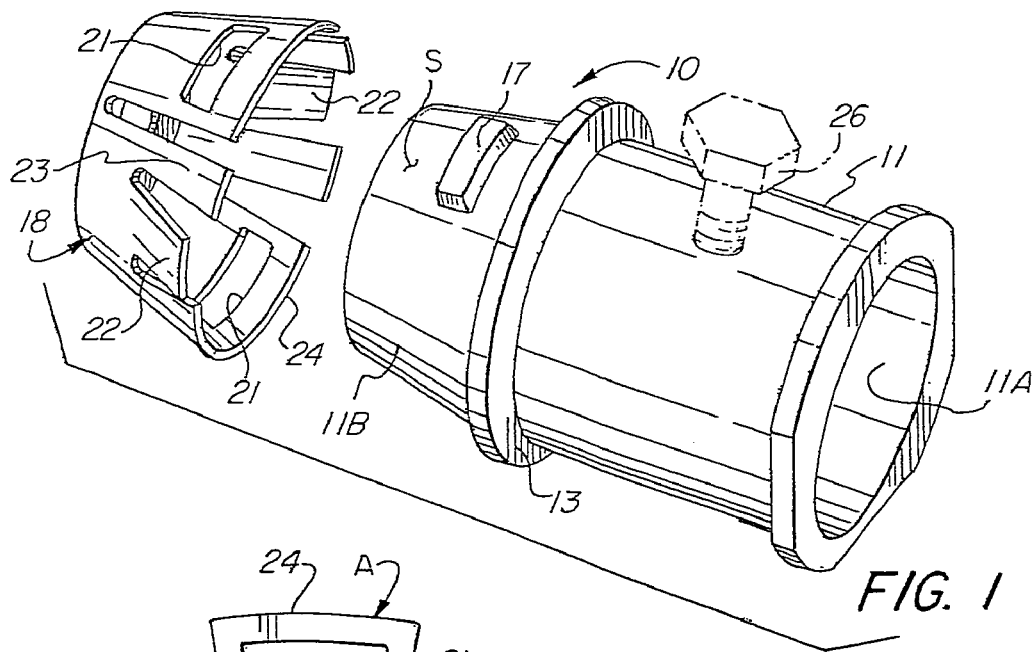
FIG. 1
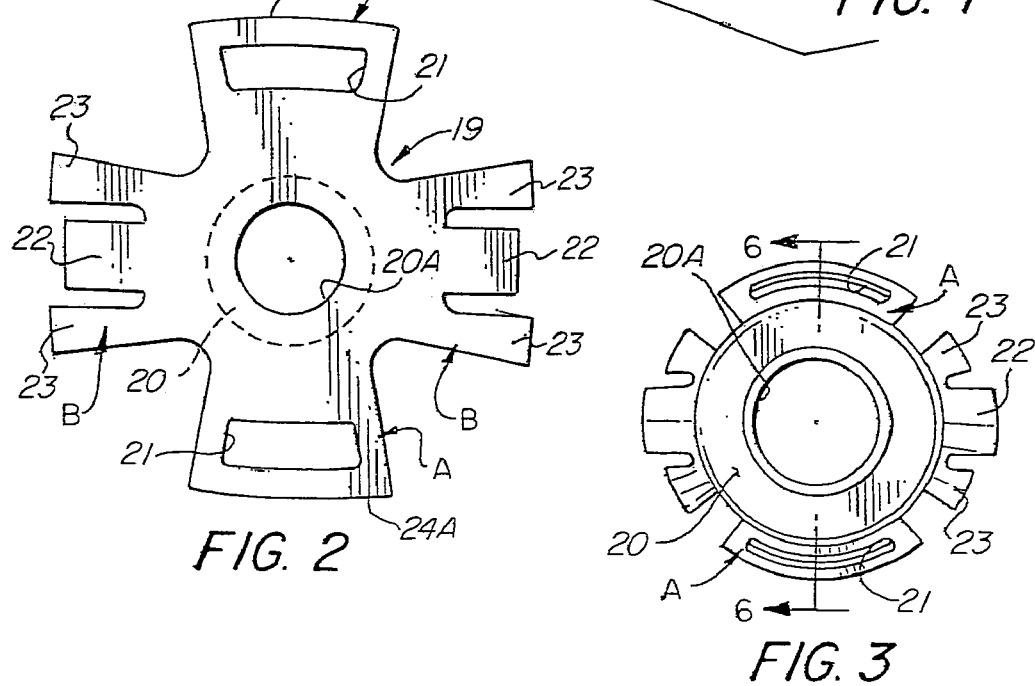
FIG. 2
FIG. 3
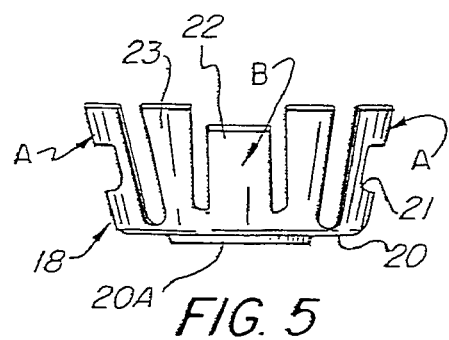
FIG. 5
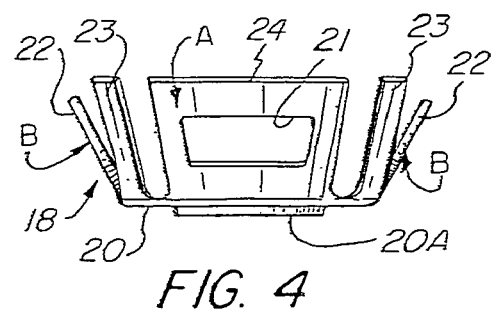
FIG. 4

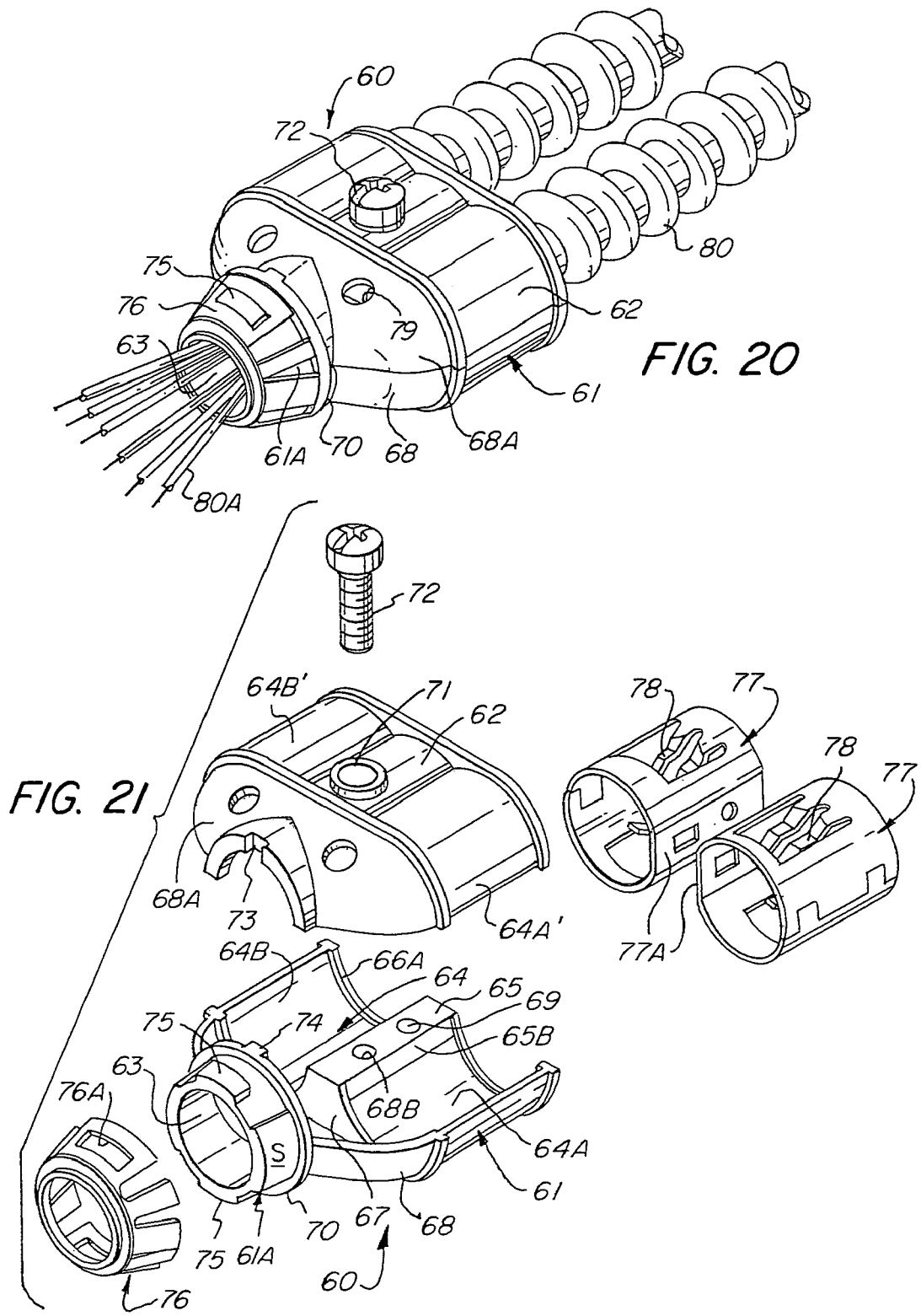

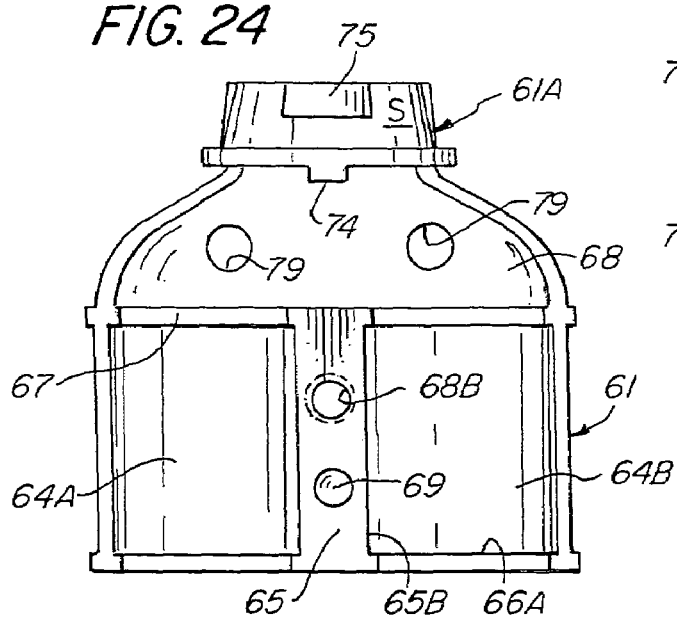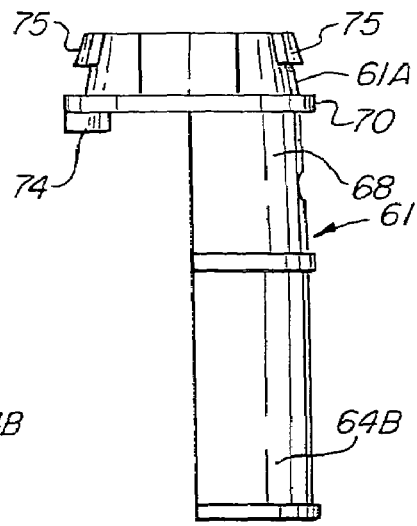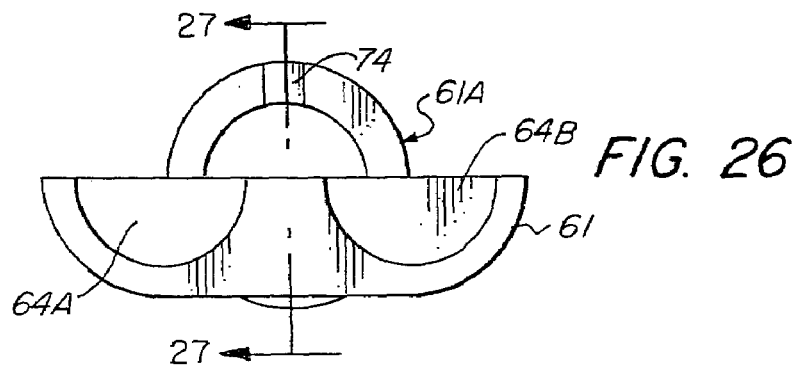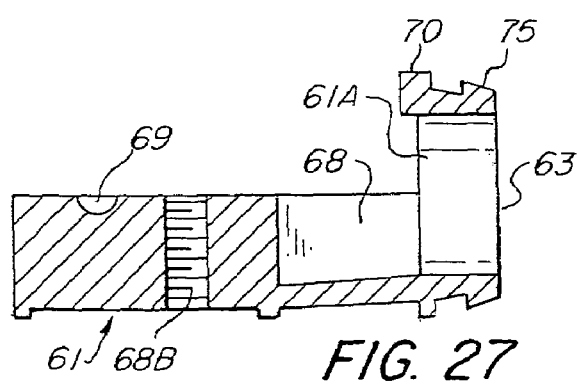

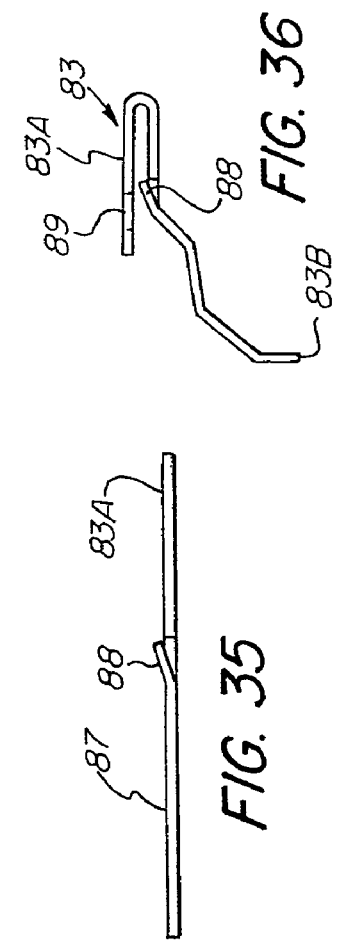
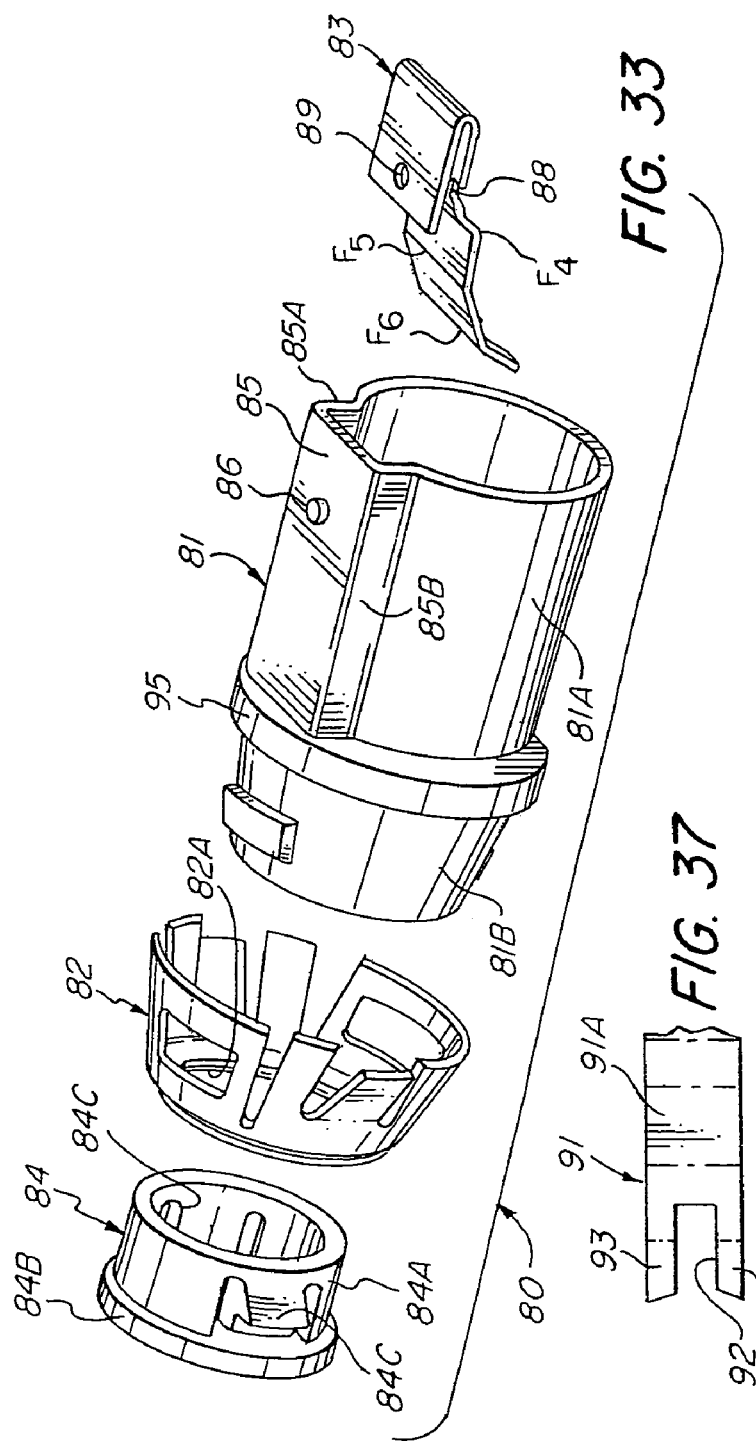
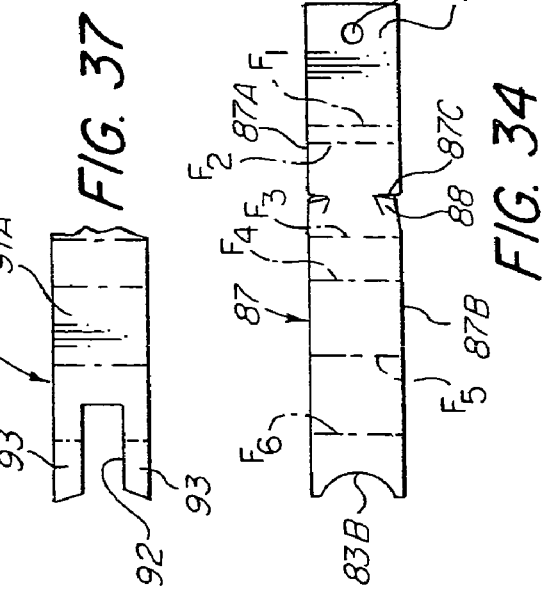

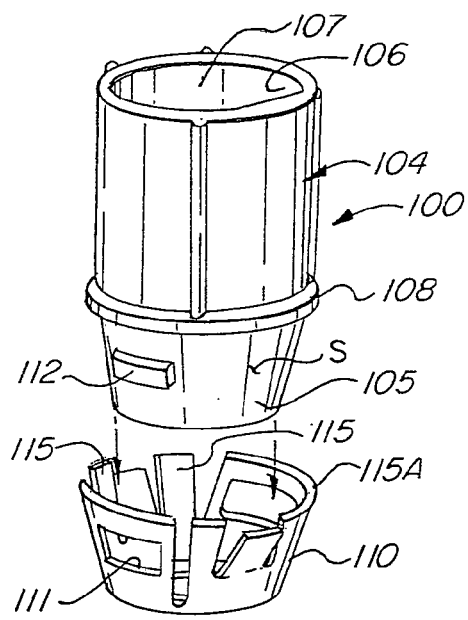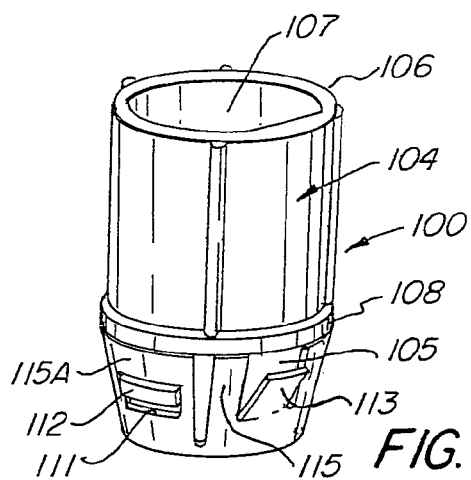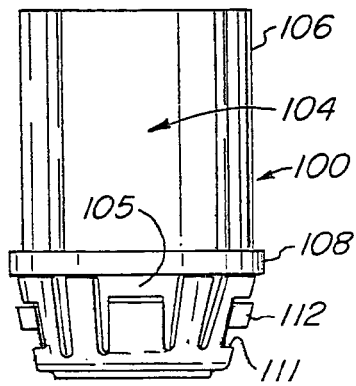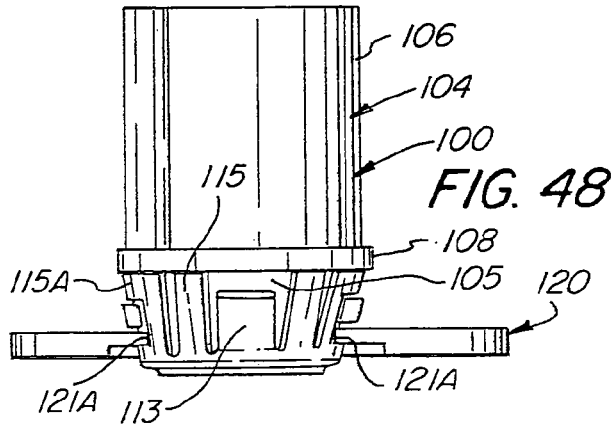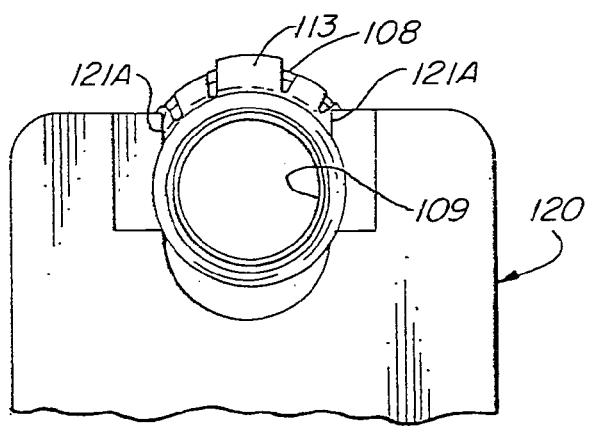

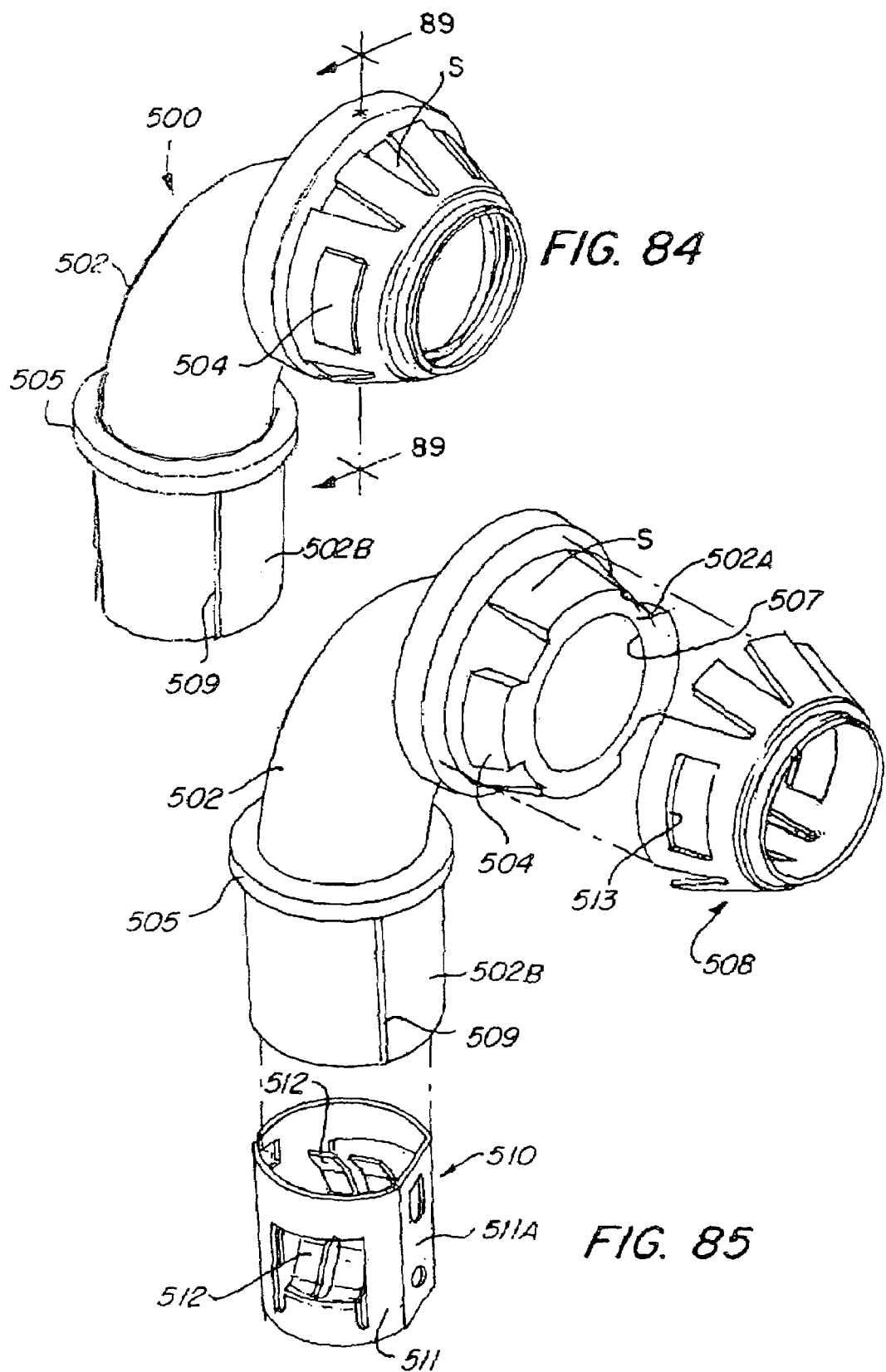

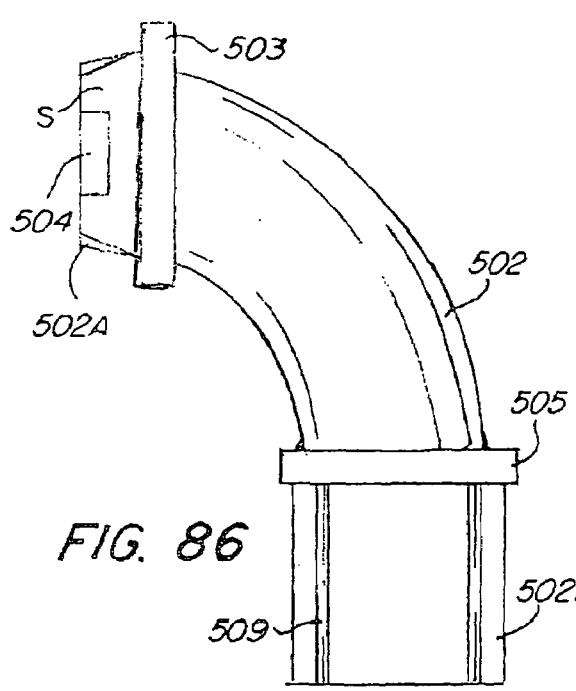
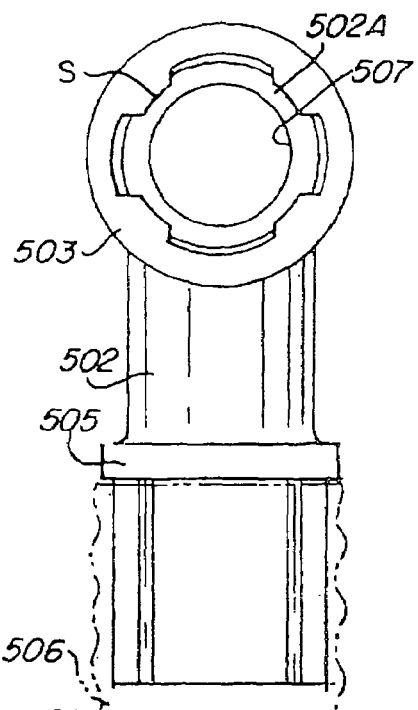
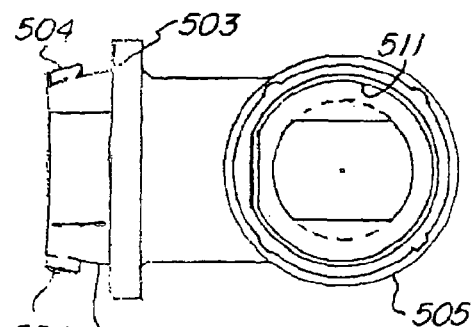
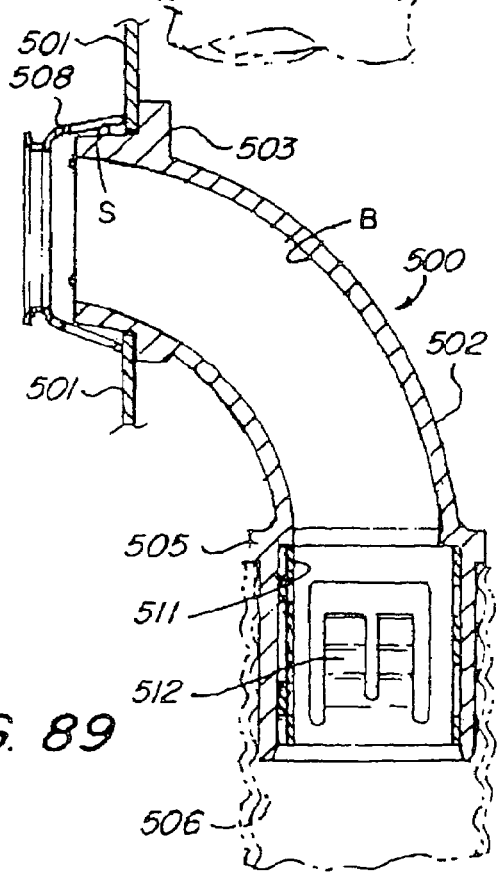
FIG. 86
FIG. 87
FIG. 88
FIG. 89

ELECTRICAL CONNECTOR HAVING AN OUTLET END ANGULARLY DISPOSED RELATIVE AN INLET END WITH OUTER RETAINER RING ABOUT THE OUTLET END AND INTERNAL UNIDIRECTIONAL CONDUCTOR RETAINER IN THE INLET END

RELATED APPLICATIONS

This application is a continuation in part application of application Ser. No. 11/501,131 filed Aug. 8, 2006 for Electrical Connector With Outer Retainer Ring and Internal Unidirectional Conductor Retainer, which is a continuation in part application of application Ser. No. 11/403,099 filed Apr. 12, 2006 now U.S. Pat. No. 7,151,223 for Snap Fit Electrical Connector Assembly With Frustro Conical Retainer Ring And Internal Unidirectional Snap Fit Wire Conductor Retainer, which is a continuation in part application of application Ser. No. 11/400,606 filed Apr. 7, 2006 now U.S. Pat. No. 7,154,042 for Electrical Connector With Frustro Conical Snap Fit Retainer Ring Constructed To Enhance The Insertion Of The Connector Through A Knock-out Hole Of An Electric Box, which is a continuation in part application of application Ser. No. 11/364,435 filed Feb. 28, 2006 for Snap-Fit Electrical Connector Assembly For Facilitating The Connection of the Electric Connector Assembly To An Electric Box, which is a continuation in part of application Ser. No. 11/258,990 filed Oct. 26, 2005 now U.S. Pat. No. 7,057,107, which is a continuation in part of application Ser. No. 11/151,374 filed Jun. 13, 2005 now U.S. Pat. No. 7,075,007 for Snap Fit Electrical Connector Assembly With Conical Outer Snap Fit Retainer And One Or More Internal Snap Fit Wire Retainers, which is a continuation in part of application Ser. No. 11/100,250 filed Apr. 6, 2005 now U.S. Pat. No. 7,064,272 for Snap In Electrical Connector Assembly With Unidirectional Wire Conductor Retainer Ring, which is a continuation in part application of application Ser. No. 10/939,619 filed Sep. 13, 2004 for Electrical Connector With Frustro Conical Snap Fit Retaining Ring, now U.S. Pat. No. 6,916,988 B1, each of which are incorporated herein by reference.

FIELD OF THE INVENTION

This invention is directed to a further advancement in the field of electrical connector assemblies having a snap fit retaining ring circumscribing the outlet end of a connector body for effecting a snap fit connection to an electrical box of the types described in U.S. Pat. No. 6,860,758, U.S. Pat. No. 6,935,891 and application Ser. No. 11/180,085 filed Jul. 13, 2005, which is a continuation in part application of application Ser. No. 11/028,373 filed Jan. 3, 2005, which are incorporated herein by reference.

More specifically, this application is directed to further improvements in electrical connector assemblies having an angular configuration wherein the outlet end is disposed at an angle relative to the inlet end for facilitating the connection of a flexible metal conduit and the electric connector to an electric box or enclosure.

BACKGROUND OF THE INVENTION

Electrical connectors are commonly used for attaching electrical conductors, cables, wires, electrical metal tubing (EMT) or the like to an electric box, e.g. a junction box, outlet box, switch box, fuse box, or other similar type of electric box or panel. Such known electrical connectors are either of a type that are secured to an electric box by a threaded lock nut or by means of a circular snap fit retaining ring of the type disclosed in U.S. Pat. Nos. 6,860,758; 6,444,907; 5,189,258; 5,266,050; 5,171,164; 2,744,769 and 1,483,218 for example. Reference is also made to U.S. Pat. No. 6,768,057 which is directed to a right angle type connector formed of a pair of sheet metal stampings fitted together and secured to an electrical box with a snap fit arrangement.

Also known are connectors formed as connector caps which are adapted to be fitted over the end of a conductor, cable or wires, such as disclosed in U.S. Pat. No. 4,880,387. Various other known efforts to facilitate the connection of an electrical conductor to an electric box are evidenced by U.S. Pat. Nos. 6,043,432; 6,080,933; 6,114,630; 6,133,529; 6,194,661; 6,335,488; 6,352,439; 6,355,884; 6,444,907; 6,555,750; 6,604,400; 6,670,553; 6,737,584; 6,682,355; 6,780,029 and 6,849,803.

Heretofore, electrical connector assemblies oftentimes required a connector body having the outlet end disposed at an angle relative to the inlet end for connecting a flexible conduit to a knock-out hole of an electric box or enclosure. Such known angular connector body had inlet ends provided with a cover, clamp or screw means for securing a wire conductor to the inlet end of the connector body and/or for securing the inlet end to a flexible conduit. Such known elbow or angular connector bodies having such securing means generally required the use of extraneous tools such as screwdrivers, pliers, wrenches or the like for securing of such known connector bodies or assemblies to a flexible conduit which was time consuming, a nuisance, and at times relatively difficult.

Notwithstanding the extensive background relating to electrical connectors, continuing efforts are being made to improve, simplify and/or reduce the cost and/or complexity of the known connectors in an effort to advance the electrical connector art. The disclosure herein is directed to such efforts.

SUMMARY OF THE INVENTION

An object of this invention is to provide a connector assembly having a connector body formed with an outlet end portion angularly disposed relative to an inlet end portion which is fitted with a unidirectional wire conductor retainer and which inlet end portion is formed so as to be frictionally secured to a flexible conduit without the use of any extraneous hand tools.

An object of this invention is to provide an electrical connector with a frustro-conically shaped external retaining ring having a leading edge and a trailing edge and integrally formed outwardly sprung locking tangs that can readily be connected by a snap fit to a knock-hole of an electric box, panel or enclosure wherein the trailing edge functions as the electrical ground between the electrical box and the connector assembly.

Another object of this invention is to provide for an electrical connector assembly that includes an electrical connector body having an outlet end with a frustro-conical outer surface for receiving therein a complementary frustro-conical retaining ring that is readily fitted to and retained on the outlet end portion of the connector body, and having an inlet end angularly disposed relative to the outlet end which is internally fitted with a snap fit conductor retainer.

Another object is to provide a connector assembly comprising a connector body having an outlet end free of any locking ring retaining flange, with an associated externally circumscribing snap fit retainer ring circumscribing the outlet end in a secured manner and an inlet end angularly disposed relative to the outlet end.

Another object is to provide a retaining ring, adapted to be fitted onto the outlet end of a connector body having the outlet end angularly disposed relative to the inlet end, whereby the retainer ring is frustro-conical in shape with a first series of tangs for securing the connector body relative to an electrical box and a trailing edge or tang for affecting a positive electrical ground with an associated electrical box.

Another object is to provide an electrical connector assembly having a connector body with a frustro-conical outer retainer ring circumscribing the outer surface of the connector body outlet end and a unidirectional wire conductor retainer associated with the inlet end of the connector for securing an electrical wire or conductor thereto without the need of any extraneous hand tools.

Another object is to provide a 90° electrical connector assembly that includes a unidirectional wire or conductor retainer extending internally of the inlet end thereof for frictionally retaining a wire conductor to the connector assembly so as to prevent any unintentional separation of a wire conductor therefrom.

Another object is to provide a 90° electrical connector assembly provided with a snap fitting retainer ring on the outlet end of the connector assembly for attaching the connector assembly to an electrical box with a snap fit and having an inner unidirectional wire conductor retainer extending into the inlet end of the connector assembly for securing a wire conductor thereto in a manner to prohibit any unintentional separation of the wire conductor from the connector assembly and whereby the inlet end is formed so as to be frictionally secured to a flexible conduit.

Another object of this invention is to provide a 90° electrical connector with a wire retainer whereby a helical wound wire conductor can be secured thereto by merely inserting the armored conductor wire into the inlet end of the electrical connector to secure the wire conductor thereto, so as to prohibit any unintentional separation of the wire conductor from the electrical connector and whereby a flexible conduit may be frictionally fitted to the inlet end.

Another object is to provide or a 90° electrical connector assembly that is relatively simple to fabricate, positive in operation, and economical to produce and sell.

The foregoing objects and other features and advantages are attained by an electrical connector assembly that includes a connector body having an outlet end adapted to be secured to a knock-out hole of an electric box or panel, and an inlet end angularly disposed relative to the outlet end, the inlet end being adapted to receive an electric or wire conductor. A radially outwardly extending flange circumscribes the outlet end of the connector body to function as a stop to limit the insertion of the outlet end portion of the connector body through the knockout hole of an electric box. The outlet end portion of the connector body is also provided with an outer surface that converges or tapers inwardly toward the outlet opening thereof. Formed on the surface of the outlet end portion are one or more retaining lugs, which may be circumferentially spaced about the outlet end portion. A frustro-conically shaped snap ring is fitted onto the outlet end portion.

The outer retaining ring is initially formed from a blank of sheet material, e.g. spring steel or the like, having a cruciform shape that includes a face portion or simply a central opening wherein the radiating arms of the cruciform blank are disposed about the face portion or central opening to define a frustro-conical ring or cup. The ring or cup so formed is provided with blanked out or die cut tangs to define outwardly bent locking tangs. The trailing edge of the frustro-conical ring provides for electrical grounding. The frustro-conical ring so formed also has a slot adapted to receive the retaining lug when the retaining ring is fitted onto the outlet end of the connector body so that the free or trailing edges of the ring define a grounding edge or tang that engages the inner periphery of the knockout hole of an electric box for effecting positive electrical continuity and grounding.

To form the retaining ring, the cruciform arms are arranged to be folded relative to the central opening or face forming portion that circumscribes the central opening, to define a unitary frustro-conically shaped cup-like member or ring to compliment or be fitted onto the outlet end portion of the connector body. The retaining ring thus formed is fitted over or onto the outlet end portion whereby the retaining slot formed in the ring is adapted to receive the complementary retaining lug formed on the surface of the outlet end portion for retaining or securing the ring on the outlet end portion of the connector body.

With the construction described, the connector assembly can be readily inserted through the knockout hole of an electric box wherein the locking tangs will initially be flexed inwardly to pass through the knock-out hole of an electric box, and then spring outwardly to lock the connector assembly to the electric box with the trailing or grounding edge or tang of the retaining ring being inherently biased so as to be urged against the internal periphery of the knockout hole due to the conical configuration of the retaining ring to effect a positive electric ground as a result of the inherent resiliency of the respective grounding edge or tangs and the material from which they are formed.

This invention further contemplates providing the inlet end of the connector to be angularly disposed relative the outlet end. A wire or conductor retainer is positioned within the inlet end portion for positively securing thereto a wire conductor by merely inserting the wire conductor into the inlet end of a connector. The inlet end portion is further formed so that it can be readily friction fitted to the end of a flexible conduit to effect the connection of the flexible conduit to an electric box.

IN THE DRAWINGS

FIG. 1 is an exploded perspective view of the electrical connector assembly.

FIG. 2 is a plan view of the blank from which the outer retaining ring of the present invention is formed.

FIG. 3 is a detail front view of the outer retainer ring.

FIG. 4 is a detail top plan view of the outer retainer ring of FIG. 3.

FIG. 5 is a detail end view of FIG. 4.

FIG. 20 is a perspective view of a further embodiment of the invention.

FIG. 21 is an exploded perspective view of the embodiment of FIG. 20.

FIG. 24 is the interior plan view of one section of the connector housing of the embodiment illustrated in FIG. 20.

FIG. 25 is an outer end view of FIG. 24.

FIG. 26 is an end view of the connector housing section of FIG. 24.

FIG. 27 is a sectional view of the housing section taken along line 27—27 on FIG. 26.

FIG. 33 is a perspective exploded view of a further embodiment of the invention.

FIG. 34 is a top plan view of the blank from which the wire retainer device is formed.

FIG. 35 is a side view of the blank of FIG. 34.

FIG. 36 is a side view of the blank of FIGS. 34 and 35 as formed to define wire retainer.

FIG. 37 is a top view of a slightly modified form of a wire retainer.

FIG. 45 is an exploded perspective of another modified form of the invention.

FIG. 46 is a perspective view similar to FIG. 45 illustrated in the assembled position.

FIG. 47 is a side view of FIG. 46.

FIG. 48 is a side view of the connector assembly of FIG. 47 in engagement with a pulling tool of the present invention.

FIG. 49 is a bottom plan view of FIG. 48.

FIG. 84 is a perspective view of a further modification of the invention.

FIG. 85 is an exploded perspective view of the connector assembly of FIG. 88.

FIG. 86 is a detail side elevation view of the connector body of FIG. 84.

FIG. 87 is a bottom view of FIG. 86.

FIG. 88 is a front elevation view of the connector body of FIG. 86 as connected to a flexible conduit.

FIG. 89 is a sectional view of the connector assembly taken along line 89—89 on FIG. 84 as connected to a flexible conduit.

DETAILED DESCRIPTION

Figure 6:
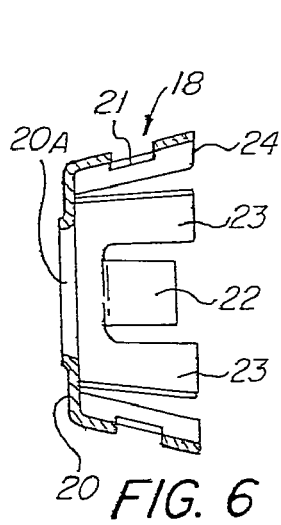
FIG. 6 is a sectional view of the outer retainer ring taken along line 6—6 on FIG. 3.

Referring to the drawings, there is shown in FIG. 1 an electrical connector assembly 10. The connector assembly 10 includes a connector body 11, which is usually formed of metal casting, e.g. zinc or other suitable metallic alloy. The connector body 11 is formed with an inlet end portion 11A and an outlet end portion 11B and having a bore 12 extending therethrough. Intermediate the connector body 11 or between the inlet end portion 11A and outlet end portion 11B there is provided a radially outwardly extending flange 13 which functions as a stop to limit the amount that the connector body 11 may be inserted through the knockout hole 14 of an electric box 15, as noted in FIG. 8.

Figure 8:
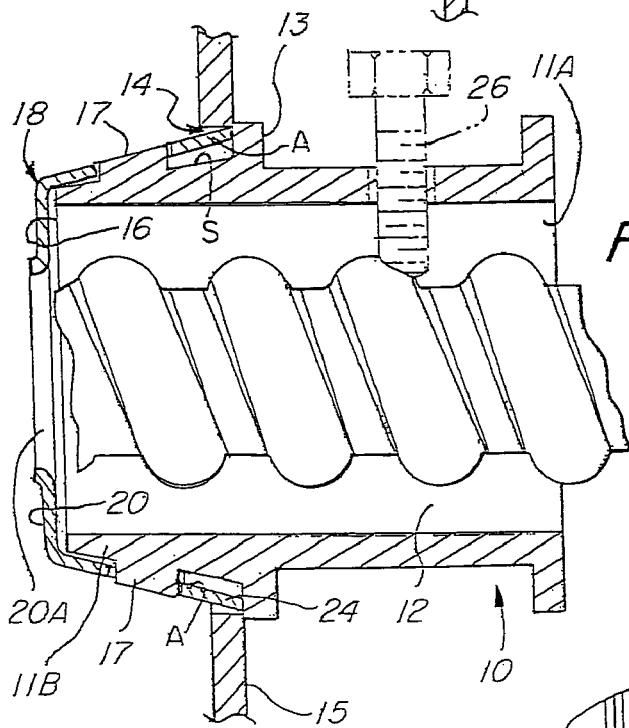
FIG. 8 is a section side view illustrating the connector assembly secured to an electric box, taken along line 8—8 on FIG. 10.
Figure 10:
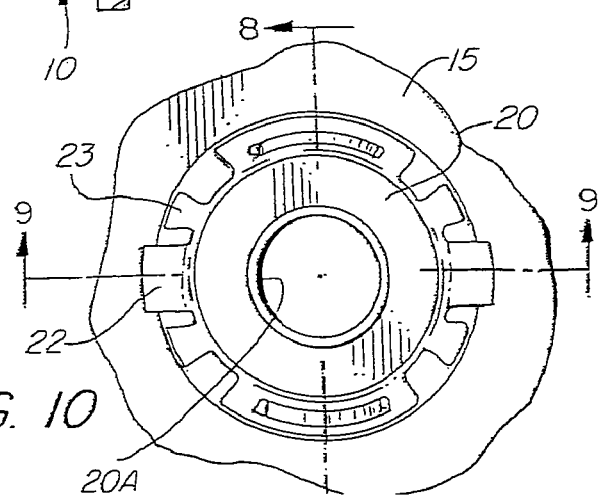
FIG. 10 is a fragmentary front view of the connector assembly secured to an electric box as viewed from the electrical box.

As shown in FIGS. 1 and 8, the outer surface S of the outlet end portion 11B slopes, tapers or converges toward the outlet opening 16 whereby the outer surface S of the outlet end portion 11B has a generally frustro-conical configuration. Formed on the surface S of the outlet end portion 11B is an outwardly projecting retainer lug 17. In the illustrated embodiment, two such lugs 17 are shown disposed 180° apart about the outer circumference of the outlet end portion 11B.

The connector assembly 10 also includes a snap fit retaining ring 18. In accordance with this invention, the retaining ring 18 is integrally formed from a blank 19 of spring steel material. As best seen in FIG. 2, the blank 19 is initially formed or stamped to define a generally cruciform shape. The cruciform shape is provided with a face portion 20 having central opening or hole 20A and having four generally radially extending arms defining two pairs of oppositely disposed arms AA and BB.

Figure 9:
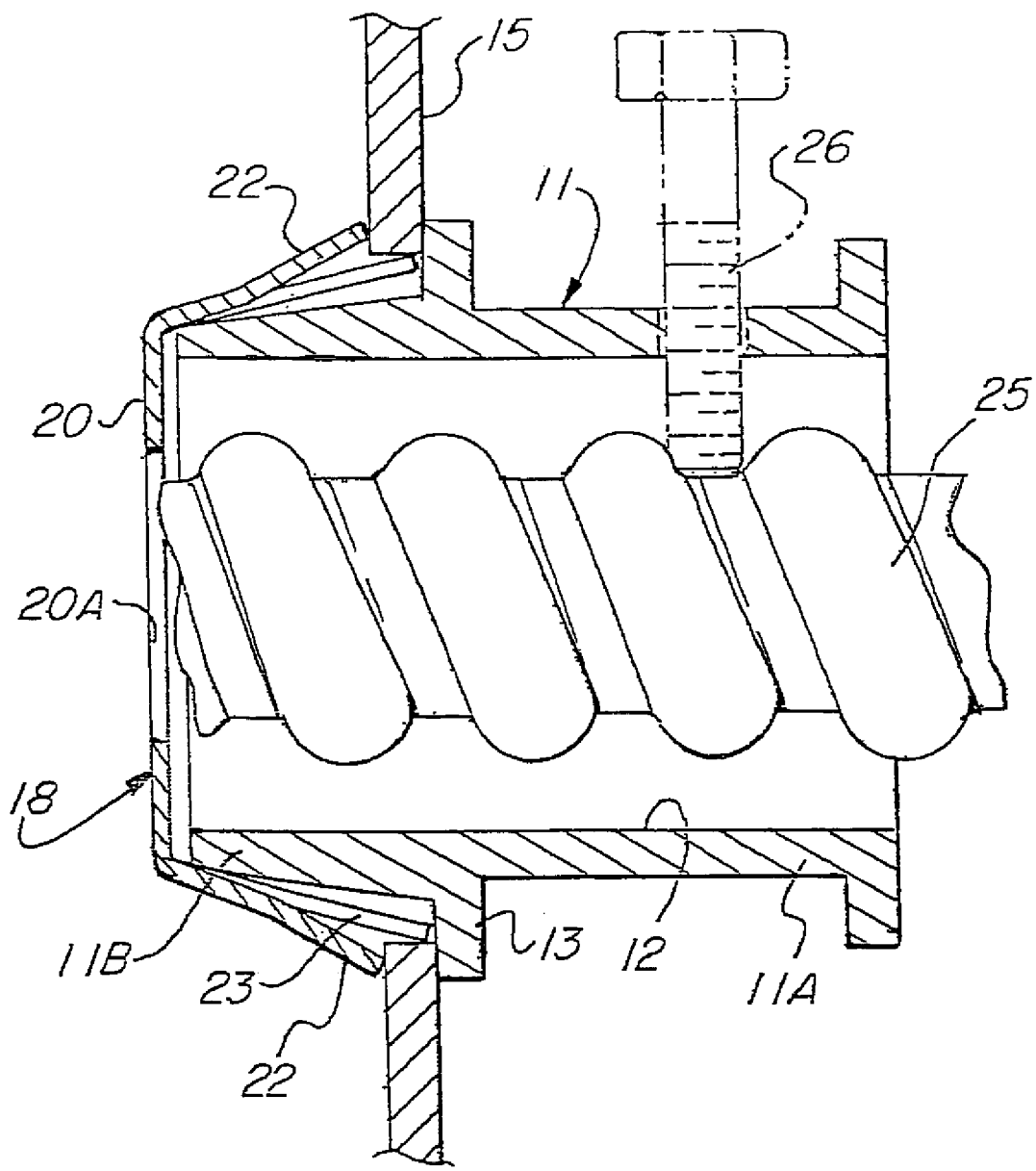
FIG. 9 is a sectional side view taken along line 9—9 on FIG. 10 and rotated 90°.

As illustrated in FIG. 2, the opposed pair of arms AA are each provided with a retaining slot 21. The opposed pair of arms BB, as best seen in FIG. 8, are blanked or formed to define a locking tang 22 and to either side thereof the trailing edge defines an electrical grounding tang 23, 23. As shown, the locking tang 22 is slightly shorter than the adjacent grounding tangs 23, 23. The arrangement is such that the free end of the locking tangs 22 are sprung outwardly and formed so as to engage the inside surface of the electric box 15 in the assembled portion, as best seen in FIG. 9, to secure the connector assembly 10 to the electric box 15 and prohibit any unintentional withdrawal of the connector assembly 10 from the electrical box 15, whereas the free ends or trailing edges of the frustro-conical ring define the grounding tangs 23 that are biased in engagement with the internal periphery of the knockout hole 14. Also, the free edges or ends 24, 24 of arms A,A in the assembled position will also function as electrical grounding tangs, as noted in FIG. 8.

In forming the retaining ring 18 from blank 19, the respective arms A,A and B,B are subjected to a series of progressive bending dies which will gradually bend the respective arms about a foldline f, which defines the face or front portion 20, whereby arms A,A and B,B form a cup having circumscribing frustro-conical or outwardly flaring sides to define a frustro conical ring 18 which complements the conical surface S of the leading or outlet end portion 11B, as seen in FIG. 1. In doing so, the locking tangs 22 are cantileverly and outwardly bent or displaced relative to the surface of the frustro-conical ring at a slightly greater outwardly angle or slope than the adjacent grounding edge or tangs 23 and the slope of arms A,A. With the retaining ring 18 so formed, it can be readily fitted onto the outlet end portion 11B whereby the inherent resiliency of the arms A,A will cause the retainer slots 22 to snap fit onto the retaining lug 17 when slots 21 are placed in alignment with lugs 17. The arrangement is such that the retainer ring 18 will be firmly and positively secured to the outlet end portion 11B as seen in FIG. 8. Yet, due to the inherent resiliency of the material of the retaining ring 18, it can be easily detached from the outlet end portion 11B when removal is desired, without destroying the ring 18 by lifting arms A,A free of the retaining lugs 17.

It will be understood that, if desired, the opening 20A may be enlarged to the diameter of the foldline f, in which case the arms A,A and B,B may be gradually bent about the periphery of the enlarged opening, thereby eliminating the face portion 20.

Figure 7:
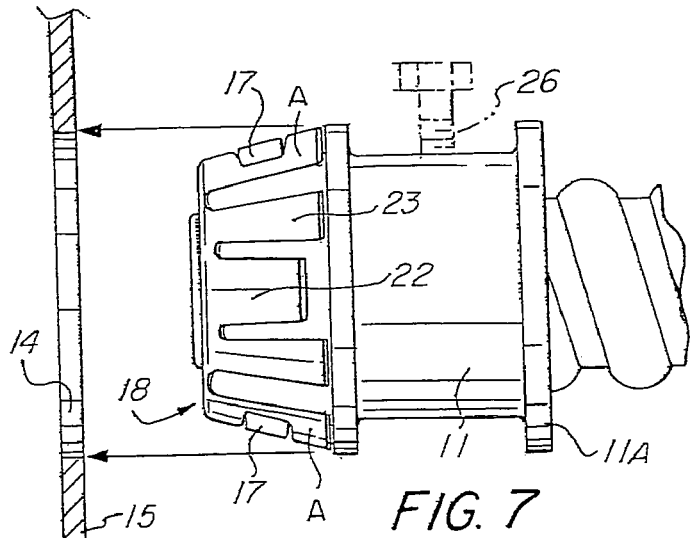
FIG. 7 is a side view of the connector assembly illustrating the alignment thereof relative to the knockout opening of an electric box.

With the retainer ring 18 properly secured to the outlet end 11B of the connector body 11, the connector assembly 10 can be readily secured to an electric box 10 by simply aligning the assembly 10 with a knockout hole 14, as best seen in FIG. 7, and inserting the leading or outlet end portion into the knockout hole 14 until the flange 13 engages the outer side of the electric box 15. In doing so, the tangs 22, 23 and the free ends 24 of arms A,A, respectively, will depress inwardly to permit insertion of the assembly 10. When the assembly is fully seated in the knockout hole 14, the locking tangs 22 will normally spring outwardly to secure the assembly 10 to the electric box 15, as noted in FIG. 9. The inherent resiliency of the grounding tangs 23, 23 and the free ends or edges 24 of arms A,A are normally biased in engagement with the internal periphery of the knockout hole 14 to ensure a positive electrical ground with the electric box 15. The engagement of the free ends 24 of arms A,A and grounding tangs 23, 23 against the inner periphery of the knockout hole 14, as noted in FIG. 8, further ensures the firm securing of the retaining slot 21 with the retaining lugs 17, so as to prohibit any disengagement of the outer retaining ring 18 from the connector body 11.

It will be understood that the wire conductor 25 may be secured to the connector assembly 10 either before or after the assembly 10 has been secured to the electric box 15. In the illustrated embodiment, the conductor wire 25 is simply inserted into the inlet end portion 11A and secured in position by a suitable securing means. In the illustrated embodiment of FIG. 1, the securing means is illustrated as a set screw 26. However, it will be understood that other forms of securing means, including some of the securing wire conductor retaining means disclosed herein, may be used in lieu of a screw.

From the foregoing, it will be apparent that the disclosed connector assembly is quite novel and simple in construction. The snap fit retaining ring 18 can be simply formed from a cruciform shaped blank 19 of spring metal whereby the opposed radially extending arms A,A and B,B can be readily formed into a cup having a generally frustro-conically shaped sidewalls complementing the slope of the outlet end portion 11A, and whereby the outer retainer ring 18 can be readily secured to the connector body simply by the inter-engagement of slots 21 with its complementary lugs 17.

In the assembled position, the outer retainer ring 18 is positively secured to the connector body in a manner to prohibit any unintentional separation. Also the tangs 22 and 23, which are formed integral with ring 18, are shaped and formed so that the locking tangs 22 secure the assembly 10 to an electric box 15 while the grounding tangs 23 ensure a positive electrical ground of the assembly 10 with the associated electric box 15.

FIGS. 11 to 19 illustrate various views of a modified form of the invention which are described in application Ser. No. 11/100,250 filed Apr. 6, 2005 for Snap In Electrical Connector Assembly With Unidirectional Wire Conductor Ring, which is incorporated by reference herein.

Figure 11:
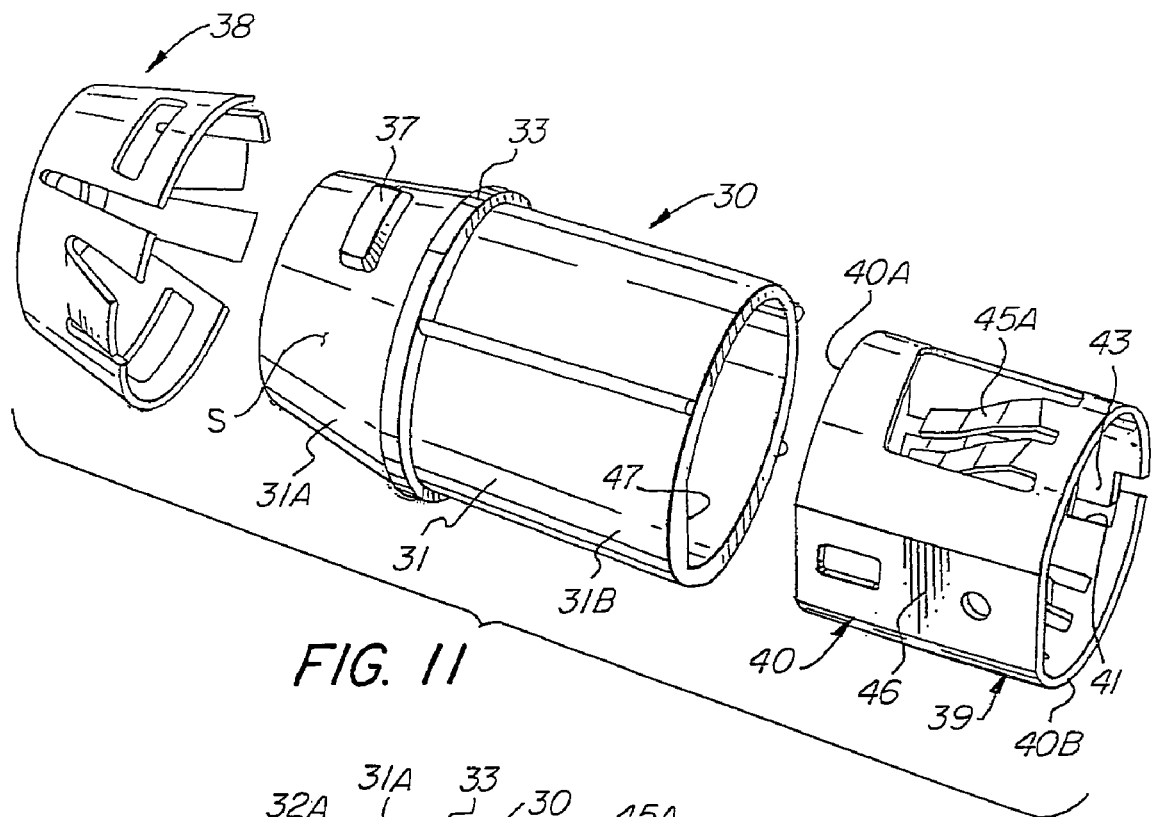
FIG. 11 is an exploded perspective view of a modified form of the invention.

In the embodiment illustrated in FIG. 11, the connector assembly 30 includes an internal wire retainer 39 in the form of a ring, cylinder or sleeve which is fitted to the bore 32B of the connector body 31, and which retainer 39 functions as a unidirectional retainer means arranged to permit a wire conductor to be readily inserted and secured thereinto, and which will resist any applied force imparted to the wire conductor in the opposite direction to prohibit any unintentional separation of the wire conductor from the connector body 31. Wire conductor, as used herein, means any wire, cable, helical wound metal covering or sheath (BX) wire, plastic sheath wire conductor and the like.

Figure 13:
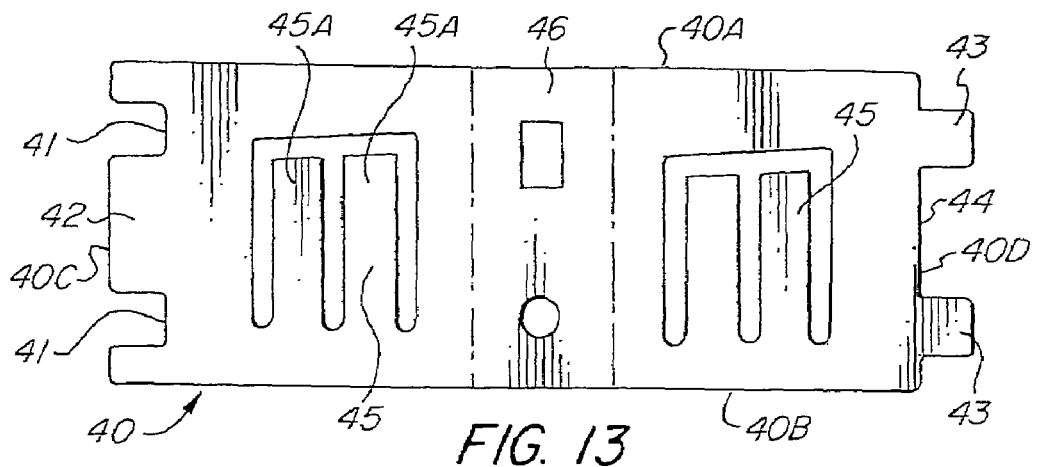
FIG. 13 is a top plan view of the blank from which the internal wire conductor retainer is formed.
Figure 14:
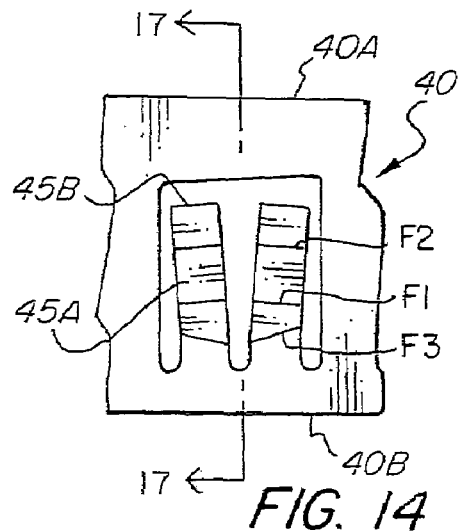
FIG. 14 is a fragmentary top view of a portion of the blank forming the inner retainer sleeve or ring.
Figure 15:
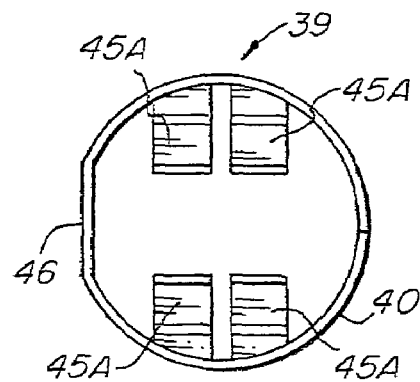
FIG. 15 is an end view of the inner wire conductor retainer ring or sleeve.
Figure 17:
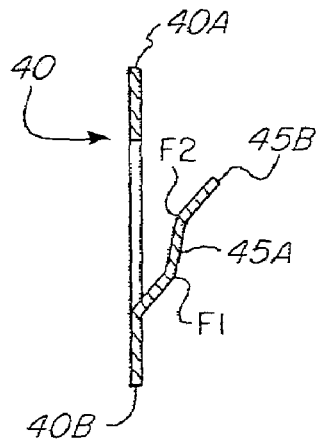
FIG. 17 is a section view taken along 17—17 on FIG. 16.

Referring to FIGS. 13 to 15, the internal retainer 39 is preferably formed from an elongated blank 40 of spring steel. The retainer blank 40, as best seen in FIG. 13, comprises an elongated generally rectangular blank having a longitudinal leading edge 40A, a trailing edge 40B and opposed end edges 40C and 40D. End edge 40C is provided with a pair of spaced apart notches 41, 41 and a projecting tongue 42. The other end edge 40D of blank 40 is provided with a pair of projecting tongues 43, 43 arranged to complement notches 41, 41 and a complementary notch 44 for receiving tongue 42 in the formed or rolled position of the retainer sleeve 39, as shown in FIG. 18.

Blanked, lanced, cut or stamped out of the plane of blank 40 are one or more tangs 45. In the form of the invention as shown in FIG. 13, tangs 45 are formed out of the plane of the blank. The respective tangs 45 are bifurcated to define a pair of finger tangs 45A, 45A longitudinally spaced along the longitudinal axis of the blank 40 at a distance, which, when the blank 40 is rolled to form the retainer sleeve 39, the respective pairs of finger tangs 45A are oppositely disposed, as best seen in FIG. 15.

Figure 18:
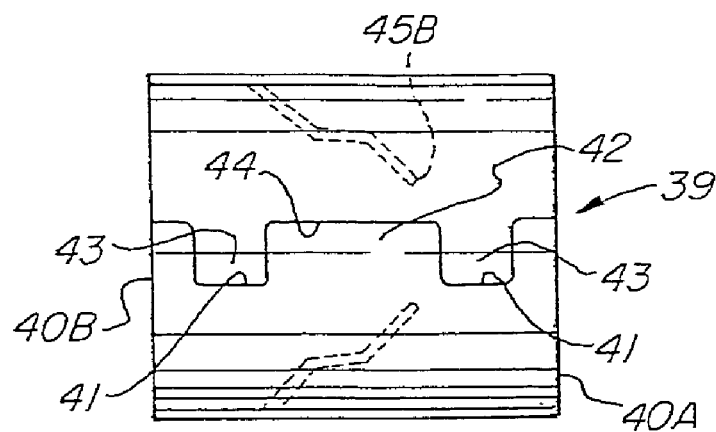
FIG. 18 is a side view of the inner retainer ring or sleeve.
Figure 19:
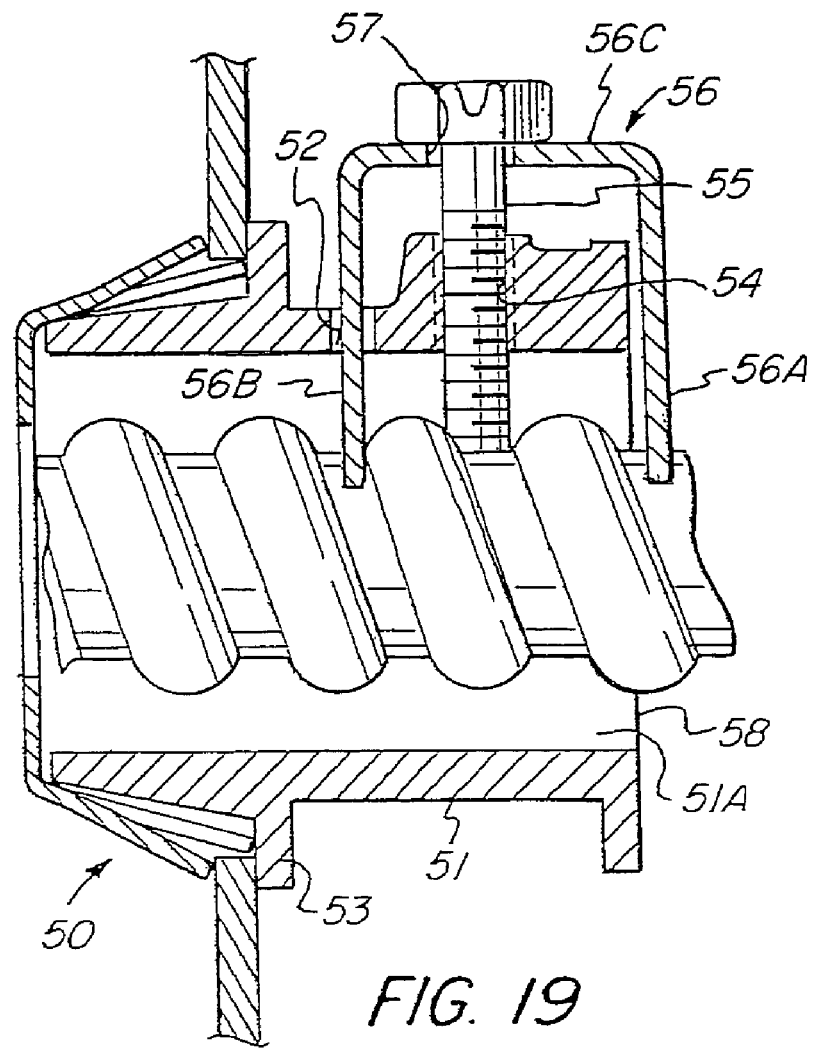
FIG. 19 is a sectional side view of still another embodiment.
Figure 22:
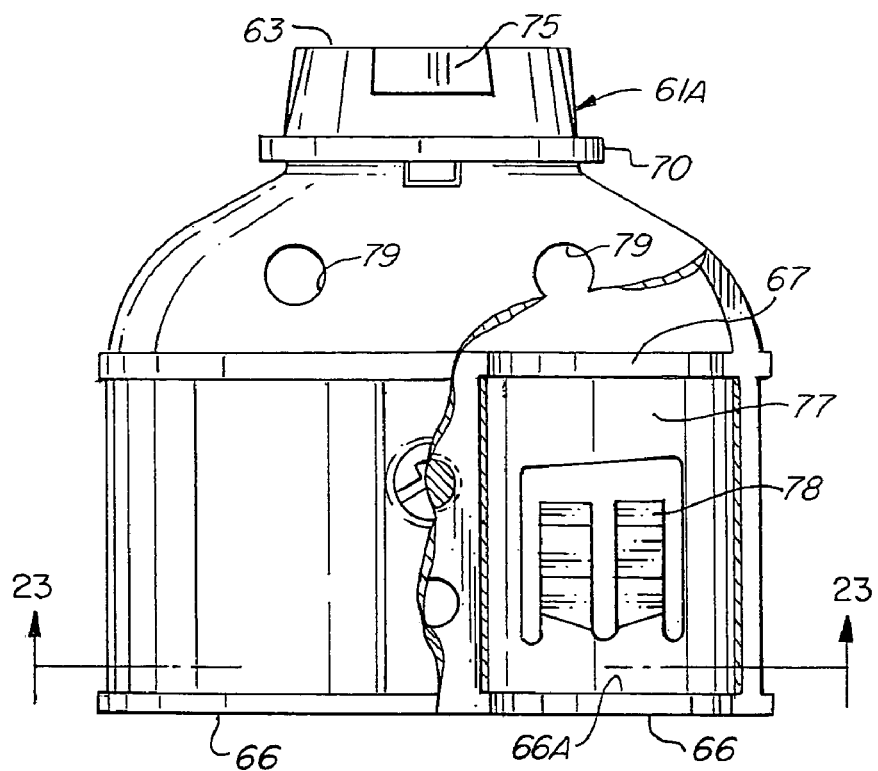
FIG. 22 is a top plan view of the embodiment of FIG. 20 having parts thereof broken away.
Figure 23:
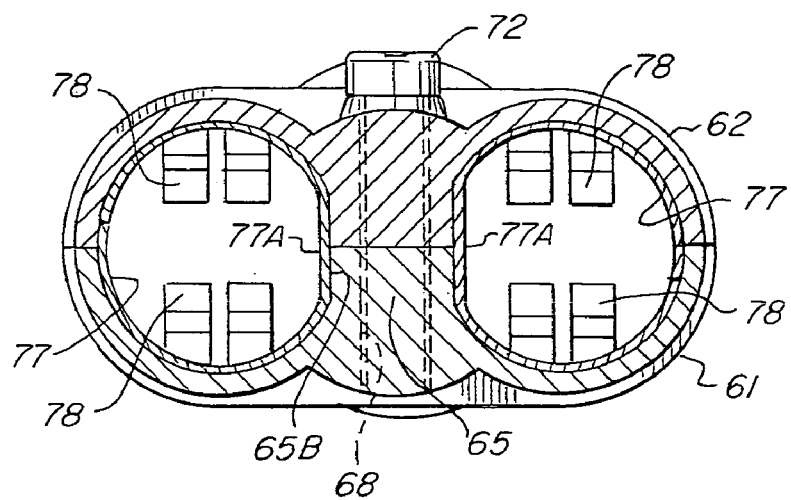
FIG. 23 is a sectional view taken along line 23—23 on FIG. 22.
Figure 28:
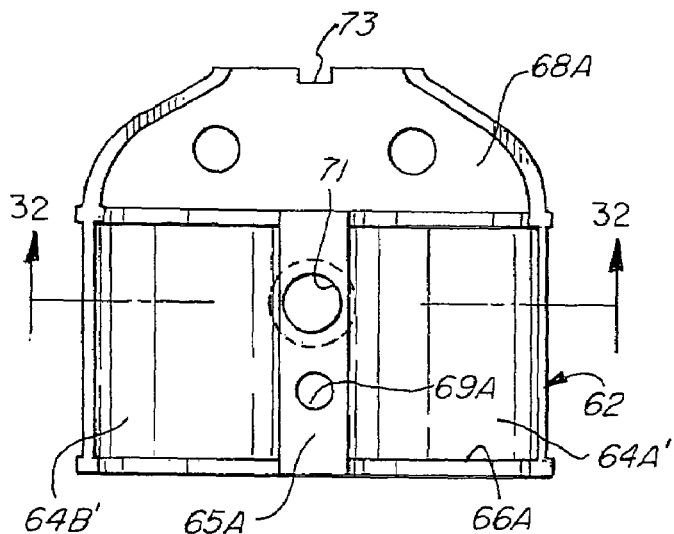
FIG. 28 is an inside plan view of the complementary housing section of the embodiment illustrated by FIG. 20.
Figure 29:
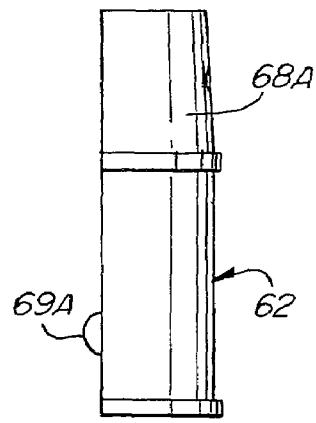
FIG. 29 is an end view of FIG. 28.
Figure 30:
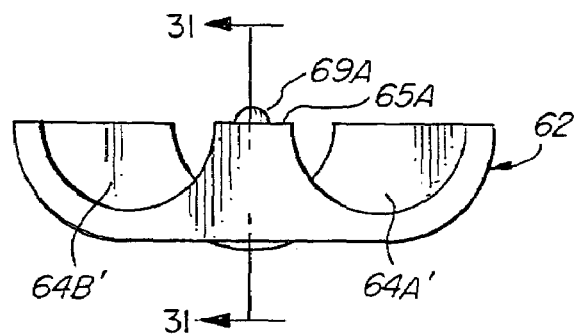
FIG. 30 is an inlet end view of FIG. 28.
Figure 31:
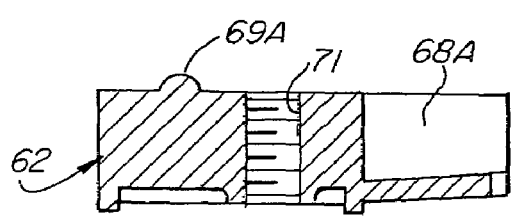
FIG. 31 is a sectional view taken on line 31—31 on FIG. 30.
Figure 32:
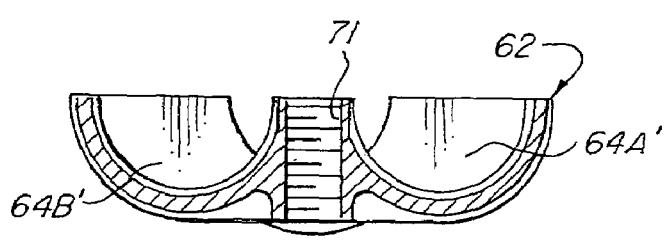
FIG. 32 is a sectional view taken on line 32—32 on FIG. 28.
Figure 38:
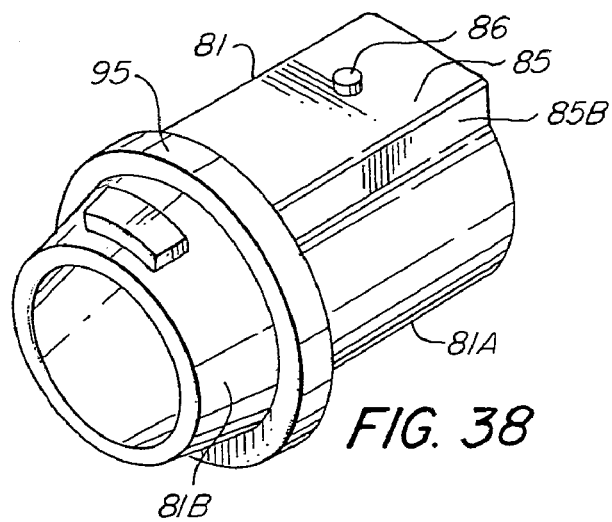
FIG. 38 is a perspective view of the connector body embodying the invention of FIG. 33.
Figure 41:
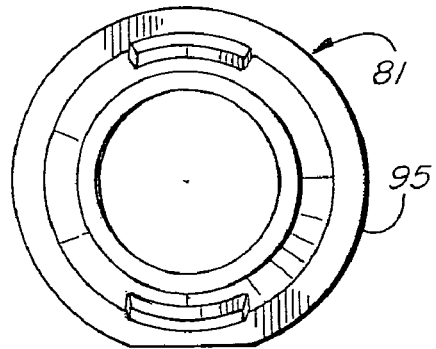
FIG. 41 is a left end view of FIG. 39.
Figure 39:
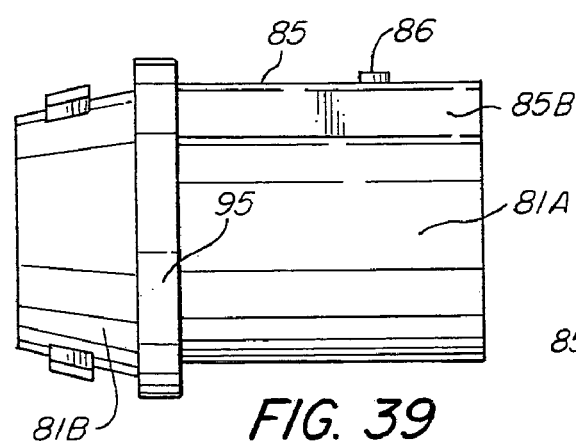
FIG. 39 is a side view of FIG. 38.
Figure 42:
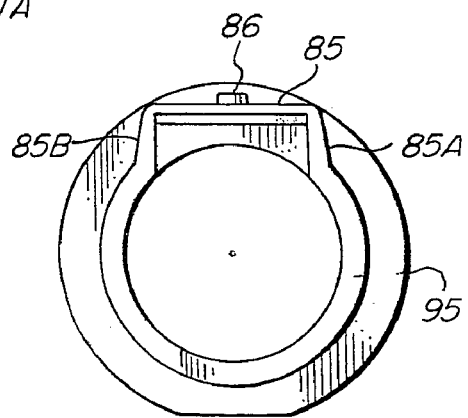
FIG. 42 is a right end view of FIG. 39.
Figure 40:
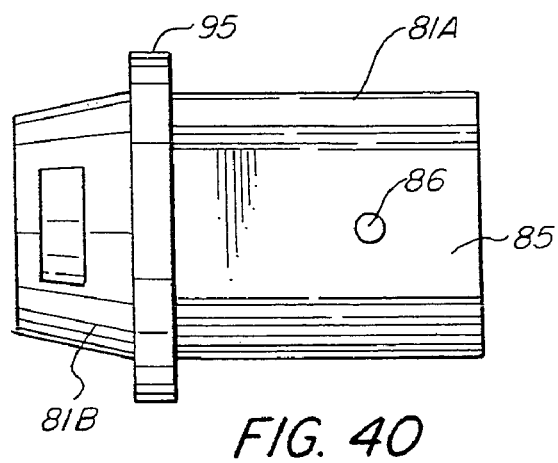
FIG. 40 is a top plan view of FIG. 39.
Figure 43:
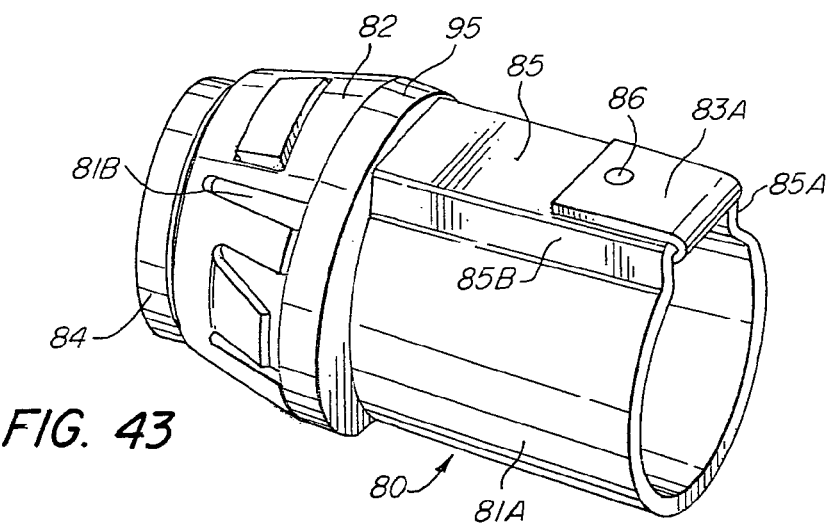
FIG. 43 is a perspective view of the assembled connector embodiment shown in FIG. 33.
Figure 44:
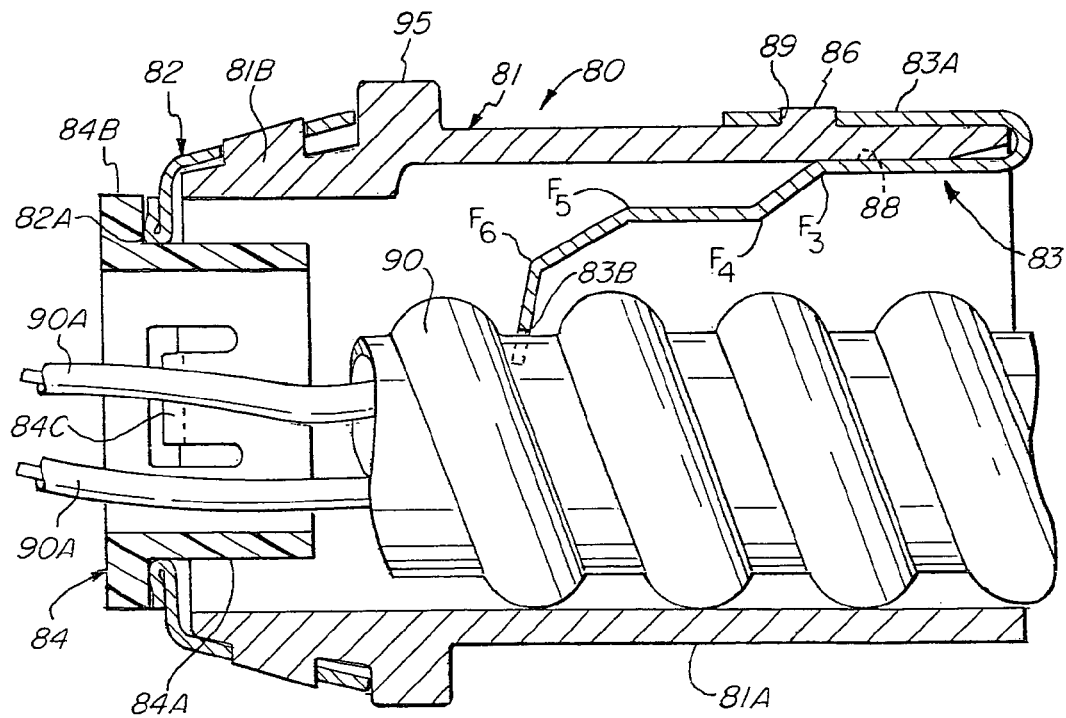
FIG. 44 is a side sectional view of the connector assembly of FIG. 43.
Figure 50:
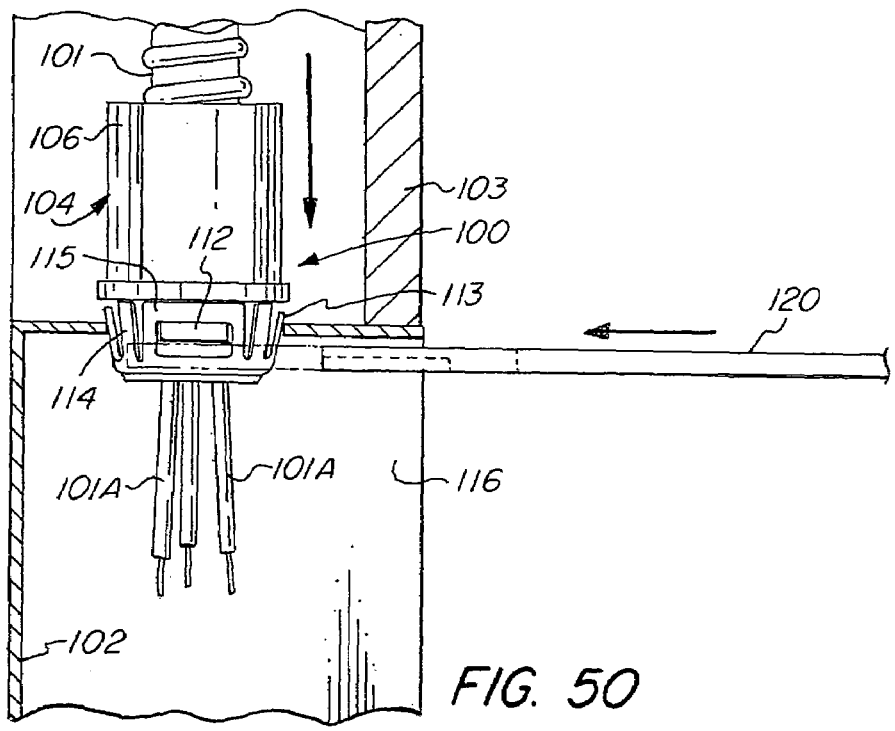
FIG. 50 is a side elevation view illustrating the initial insertion of the connector assembly of FIG. 45 into a knockout hole of an electric box.
Figure 51:
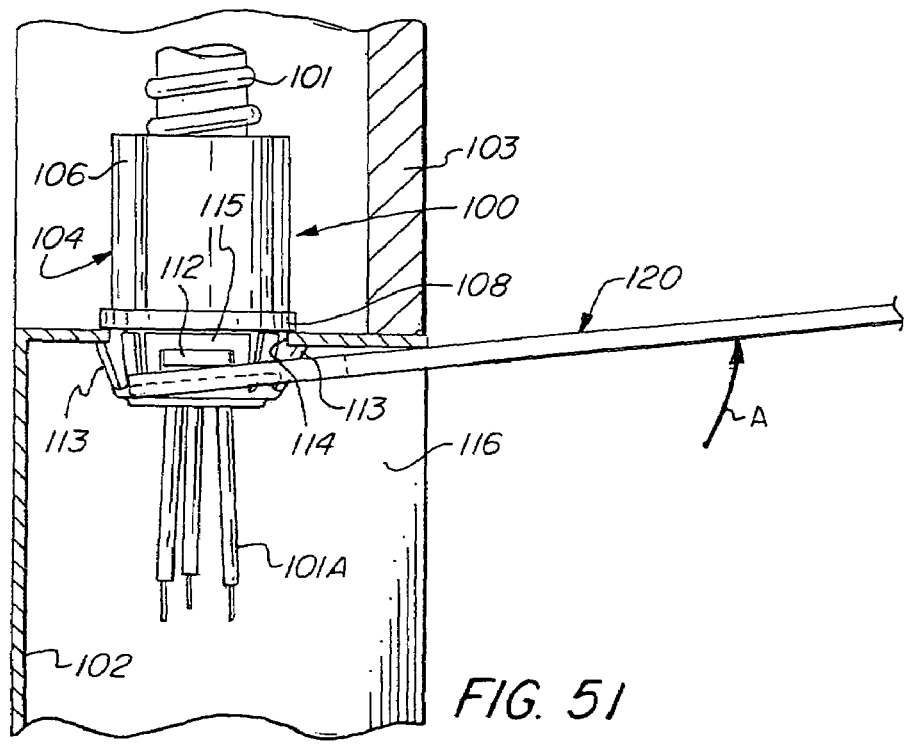
FIG. 51 is a side elevation view similar to FIG. 50 illustrating the connector assembly fully seated and locked in the knockout hole of an electric box which is affected by the lever action of the operating tool.
Figure 52:
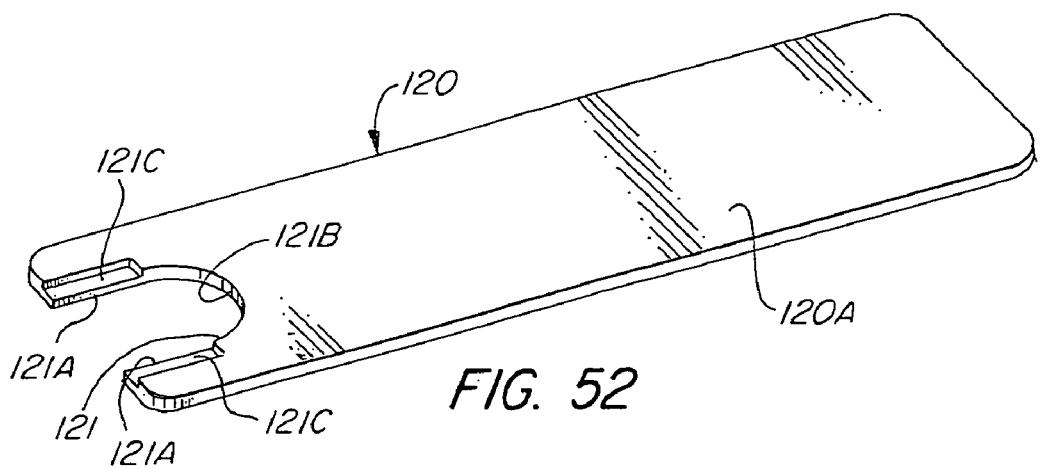
FIG. 52 is a perspective view of the operating tool embodiment for facilitating the locking of an electrical connector to an electric box.
Figure 53:
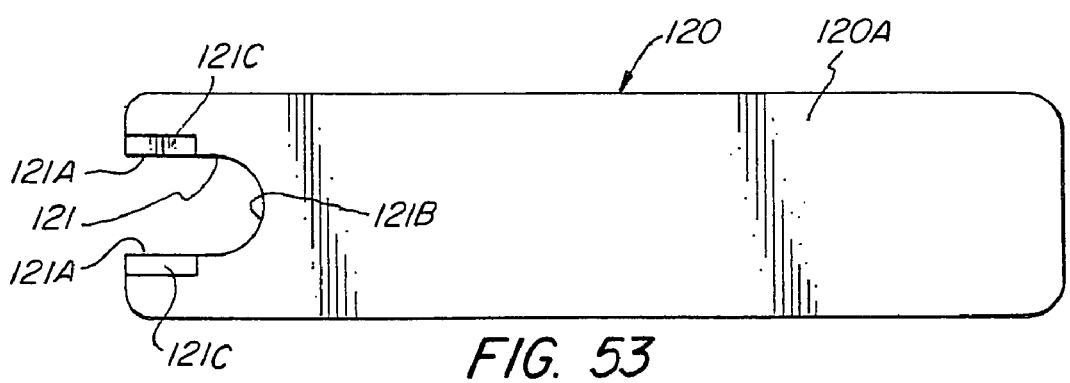
FIG. 53 is a plan view of the tool of FIG. 52.
Figure 54:
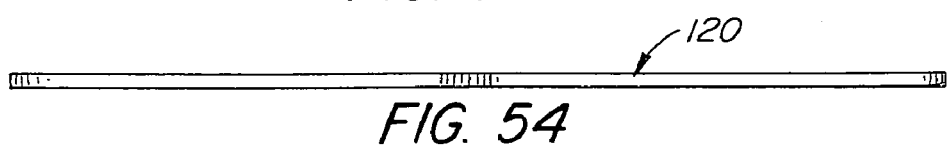
FIG. 54 is an edge view of FIG. 53.
Figure 55:
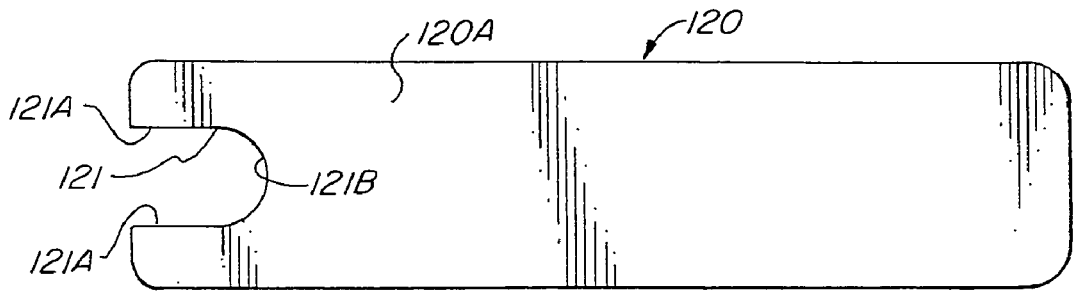
FIG. 55 is a bottom plan view of FIG. 54.
Figure 56:
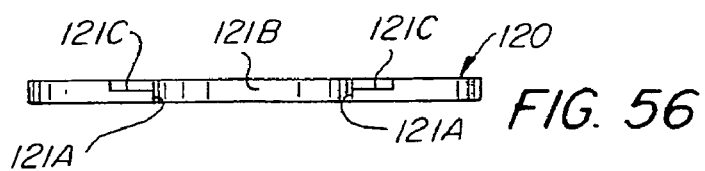
FIG. 56 is a left end view of FIG. 55.
Figure 57:
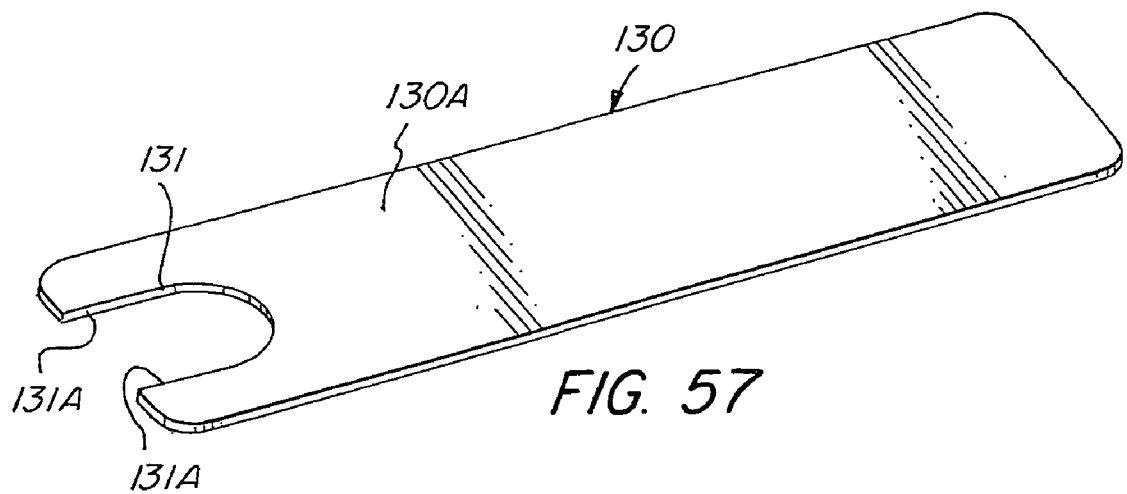
FIG. 57 is a perspective view of a slightly modified tool.
Figure 58:
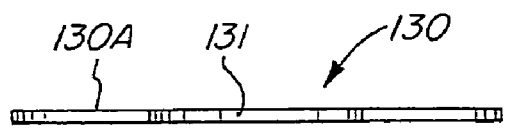
FIG. 58 is a left end view of FIG. 57.
Figure 59:
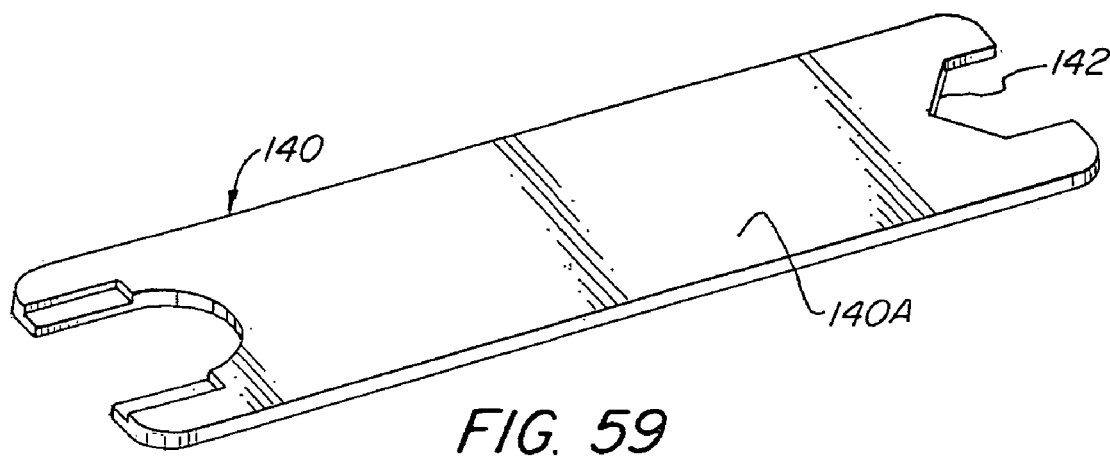
FIG. 59 is a perspective view of still another modified operating tool.
Figure 60:
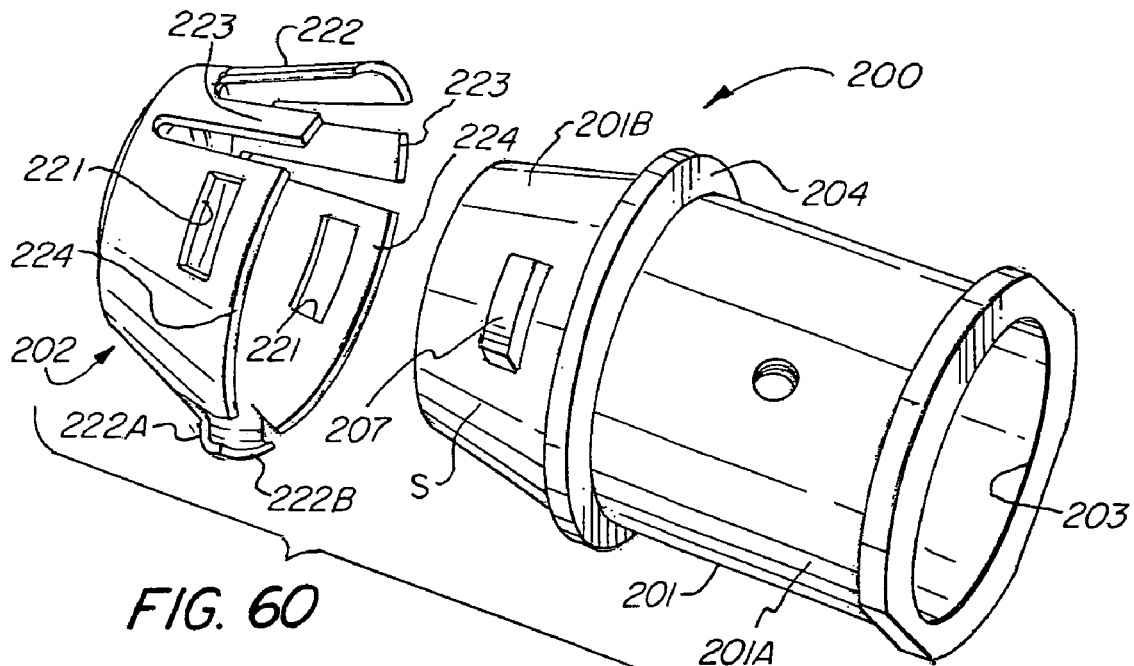
FIG. 60 is an exploded perspective view of another modified form of the invention.

As shown in FIGS. 15 and 18, the respective finger tangs 45A, 45A are inwardly bent from the plane of the retainer sleeve 39. In the illustrated embodiment, the respective finger tangs are provided with a pair of intermediate transverse fold lines $F_1$ and $F_2$ whereby the free end of the respective finger tangs is directed toward the longitudinal axis of the sleeve 39, as shown in FIG. 18.

Referring to FIG. 15, it will be noted that the retainer sleeve is or may be provided with a flattened portion 46 on one side thereof.

Figure 12:
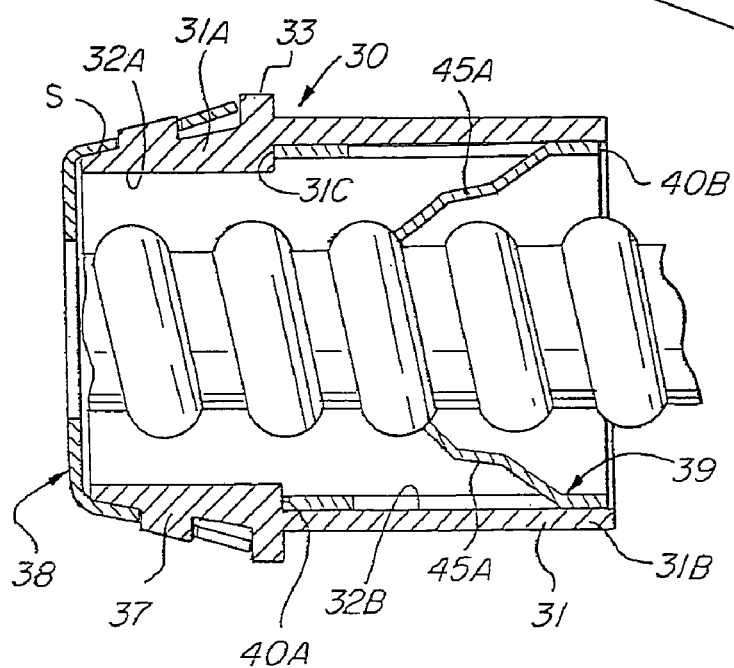
FIG. 12 is a sectional side view of the modified form of the invention of FIG. 11.

The connector body of FIGS. 11 and 12 may be formed with an internal complementary flat surface along a portion of the inner circumference thereof. The arrangement is such that the retainer sleeve 39, when inserted into the inlet end 31B of the connector body, is oriented so that the flattened surface 46 of the sleeve 39 complements the internal flattened surface 47 of the connector body. The orientation is such that the opposed finger tangs 45A are oppositely disposed to firmly grip the wire conductors, e.g. an armored conductor or other covered conductor.

The outer circumference of the inner retainer sleeve or ring 39 is proportioned so that it can be press fitted or frictionally fitted into the inlet end 31B of the connector body 31 by a force sufficient to firmly secure the inner retainer ring or sleeve 39 within the inlet end so as to prohibit any separation of the retainer ring or sleeve 39 from the inlet end of the connector body. The complementary flattened surfaces 46 of the internal sleeve 39 and 47 of the inlet end of the connector body insures proper orientation of the internal sleeve 39 within the inlet end of the connector body.

Figure 16:
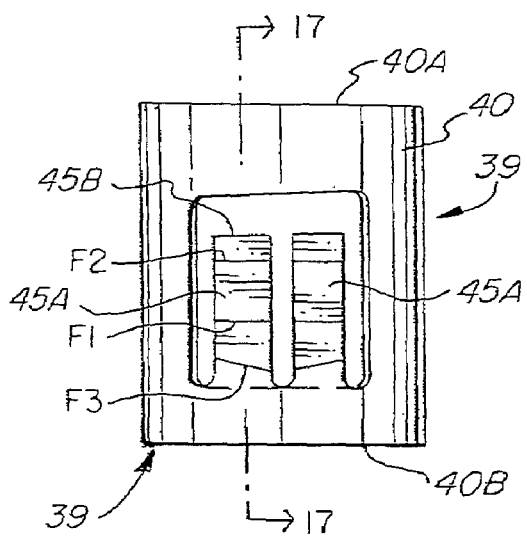
FIG. 16 is a top view of the inner retainer ring or sleeve of FIG. 15.

FIG. 14 illustrates a fragmentary portion of the blank 40 to show an intermediate step in forming the tang fingers 45A, 45A so that when the formed blank 40 is rolled to form the internal retaining sleeve, the tang fingers will be disposed in parallel as seen in FIGS. 15 and 16. This is attained by fold line $F_3$ which is disposed at an angle, as noted in FIG. 14, so that when the blank is rolled to form the internal retaining sleeve 39, the tang fingers 45A, 45A will be disposed in parallel. The free ends 45B of the respective fingers 45A are angularly offset to engage the grooves of an armored conductor, as noted in FIG. 12 or other covering sheath of a wire conductor that will resist a force attempting to effect separation of the conductor from the connector assembly. The respective free ends 45B may also be laterally offset so that an armored conductor may be threadedly connected to the internal sleeve 39, as well as by simply inserting the armored covered conductor into the retainer sleeve to effect a snap fit connection.

FIGS. 20 to 32 are directed to a further modification of the disclosed invention. As best seen in FIGS. 20 and 21, the connector assembly 60 includes a housing or connector body 61 having an outlet end 61A and an inlet end 64 connected to the outlet end 61A by a transition section 68, 68A, preferably formed as casting of any suitable metal or alloy material, e.g. zinc, aluminum and the like. While the inlet end 64 of the connector body 61 is illustrated as a duplex inlet end, it will be understood that the inlet end may be formed to accommodate more than two separate wire conductors, cables or the like.

The outlet end 61A and the external frustro-conical ring 76 circumscribing the outlet end 61A are similar in structure hereinbefore described with respect to FIGS. 1 to 10. A more detailed description of the embodiments disclosed in FIGS. 20 to 32 is set forth in application Ser. No. 11/100,250 filed Apr. 6, 2005 for Snap In Electrical Connector Assembly With Unidirectional Wire Conductor Retaining Ring, which is incorporated herein by reference.

With the connector body of FIG. 20 illustrated, it will be noted that the connector assembly 60 can be readily secured to an electric box or panel simply by inserting the leading or outlet end 61A through a knockout hole of a panel or electrical box so as to be readily secured thereto with a snap fit as hereinbefore described. With the arrangement described, the respective wire conductors or cables 80 can be readily attached to the trailing or inlet end of the connector assembly 60 with a simple snap fit, as described in application Ser. No. 11/100,250 filed Apr. 6, 2005, which is also incorporated by reference herein.

From the foregoing, it will be noted that the connector assemblies disclosed in FIGS. 1 to 32 utilize a frustro conically shaped outer retainer ring which is uniquely secured to the leading end of a connector body, with securing tangs and grounding tangs arranged to effect both a positive securement of the connector assembly to a knockout hole of an electric box or panel and a positive electrical ground. In association with an external frustro conical retaining ring, the disclosed embodiments include a trailing or inlet end constructed to receive an associated wire or conductor retainer in each inlet end for securing a wire conductor thereto by a snap fit inlet end of the connector body. It will be understood that the described electrical connector bodies may include one or more wire receiving chambers formed in the inlet end thereof, depending upon the number of wire conductors one may wish to connect to the inlet end of a connector body.

FIGS. 33 to 44 illustrate a further modification of the invention. In this embodiment, the connector assembly 81 includes a connector body 81A having an outer frustro conical external snap-fit retainer ring 82, a wire retainer device 83, and an optional plastic electrical insulating end ring insert 84. The outlet end 81B of the connector body 81A and the external frustro-conical retainer ring is similar in structure and function as hereinbefore described. A more detailed description of the embodiments 33 to 44 are set forth in application Ser. No. 11/151,374 filed Jun. 13, 2005, which is incorporated herein by reference.

FIGS. 45 to 51 illustrate another embodiment of the invention. The embodiment of FIGS. 45 to 51 is directed to a snap-fit electrical connector assembly 100 which is particularly suitable for attaching an electric cable or conductor 101 to an electric box 102 which is disposed in a finish wall structure 103, and which is rendered the subject matter of an application Ser. No. 11/258,990 filed Oct. 26, 2005, which is incorporated herein by reference.

It is frequently necessary to upgrade, repair, or add new electric conductors or circuits to existing electric boxes concealed within the wall of an existing structure. In such instances, the installer is generally unable to access a snap-fit connector so as to apply the necessary pulling or pushing force necessary to insert and lock a snap-fit connector assembly, e.g. 100, in a knockout opening of the electric box 102. Heretofore, in such situations, the installer generally utilized a connector having a threaded outlet end which could be readily passed through a knockout hole of an electric box, which could then be secured by threading thereon a lock nut from within the box opening, which is both difficult and time consuming.

The connector assembly 100, as illustrated, includes a connector body 104 having a leading end or outlet end 105 and a trailing or inlet end 106. The connector body may be formed as a metal casting of a suitable material, e.g. a zinc alloy, having a bore 107 extending therethrough. Circumscribing the connector body 104 between the outlet end 105 and the inlet end 106 is a radially outwardly extending stop flange 108. As hereinbefore described, the outer surface S of the outlet end 105 tapers or converges inwardly toward the central axis of the connector body 104 and the outlet opening 109.

Complementing the slope or taper of the outer surface S of the outlet end 105 is a frustro-conical snap-fit retainer ring 110 which is similar in structure hereinbefore described with respect to FIGS. 1 to 4, except that the width of the retaining slot 111 adapted to receive the retaining lug 112 is enlarged, as compared to the width of retaining slot 21 as hereinbefore described. As best seen in FIGS. 47 and 48, the retaining slot 111 has a width which is greater than the width of the retainer lug 112 adapted to be received in slot 111 in the assembled position, as best illustrated in FIGS. 46 and 47. In all other respects, the structure of the retainer ring 110 is similar to the construction of retainer ring 18 hereinbefore described with respect to the embodiments illustrated, for example in FIGS. 1 to 4, and which need not be repeated. A more detailed description of FIGS. 45 to 51 is set forth in application Ser. No. 11/258,990 filed Oct. 26, 2005, which is incorporated herein by reference.

Figure 61:
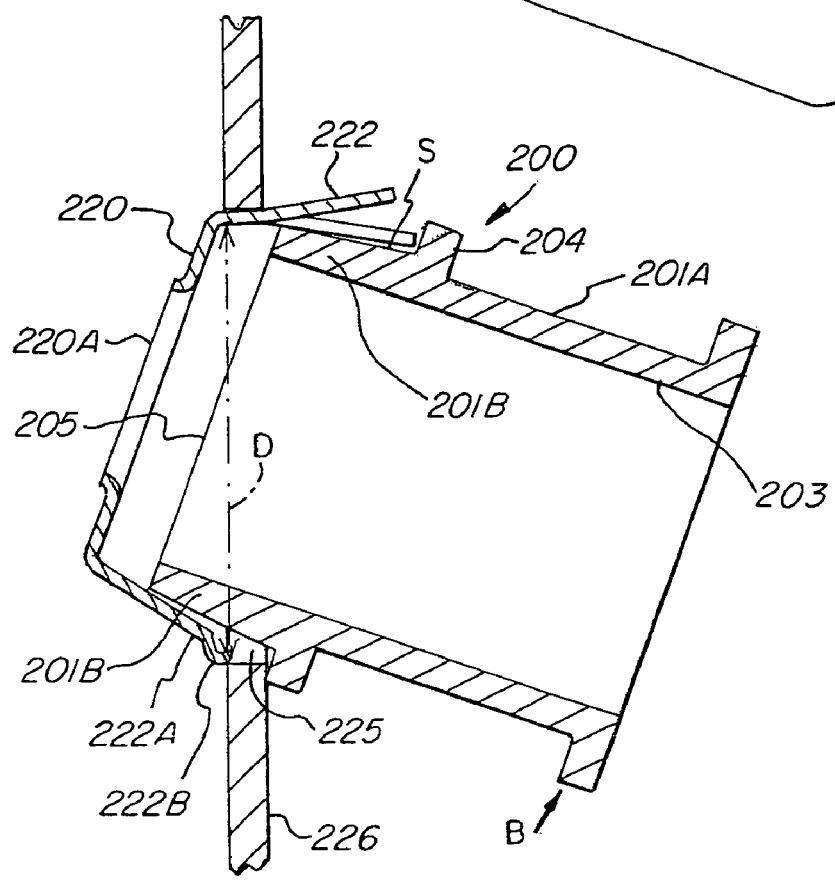
FIG. 61 is a section side view of the embodiment of FIG. 60 illustrating the manner for effecting the connection of the modified embodiment of FIG. 60 to a knock-out hole of an electric box.
Figure 62:
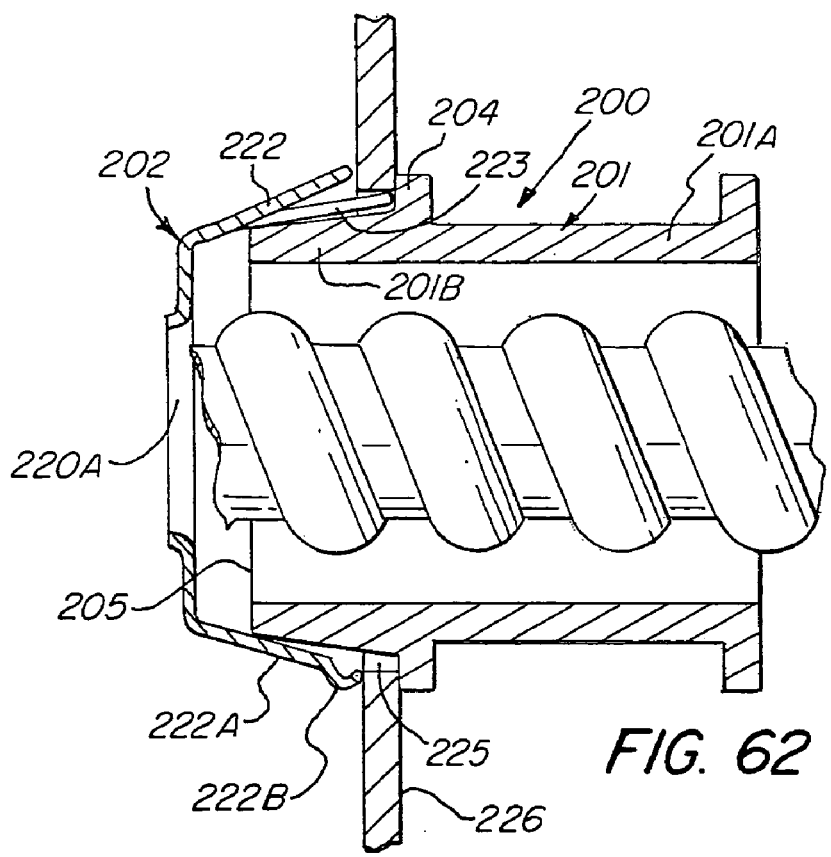
FIG. 62 is a section side view similar to FIG. 61 illustrating the connector assembly of FIG. 61 in locked position relative to an electric box.
Figure 63:
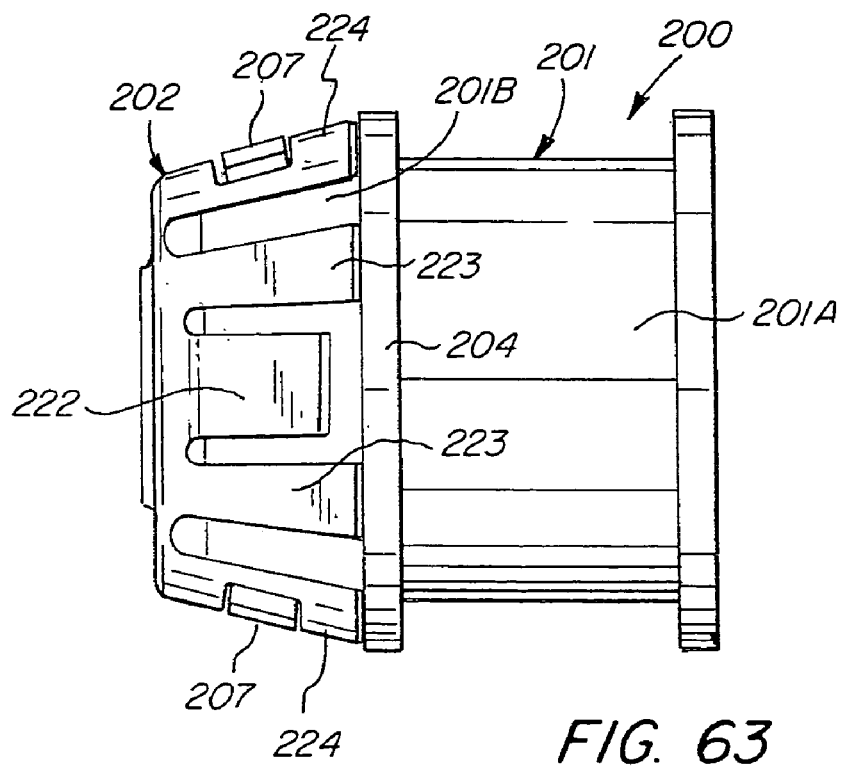
FIG. 63 is an assembled view of FIG. 1 connector
Figure 64:
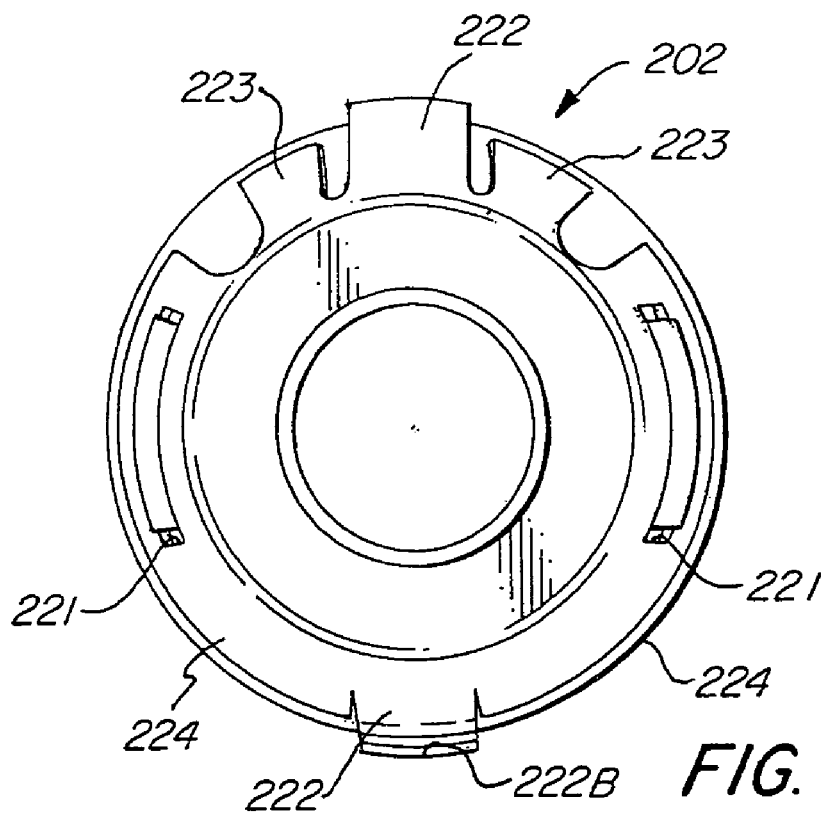
FIG. 64 is a front end view of the frustro-conical retainer ring of the embodiment illustrated in FIG. 60.
Figure 65:
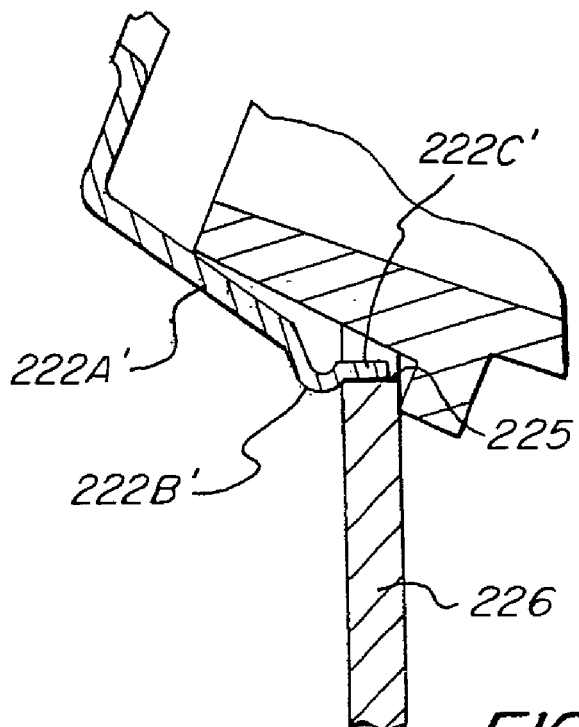
FIG. 65 is a fragmentary detail sectional side view of a modified auxiliary tang construction.
Figure 66:
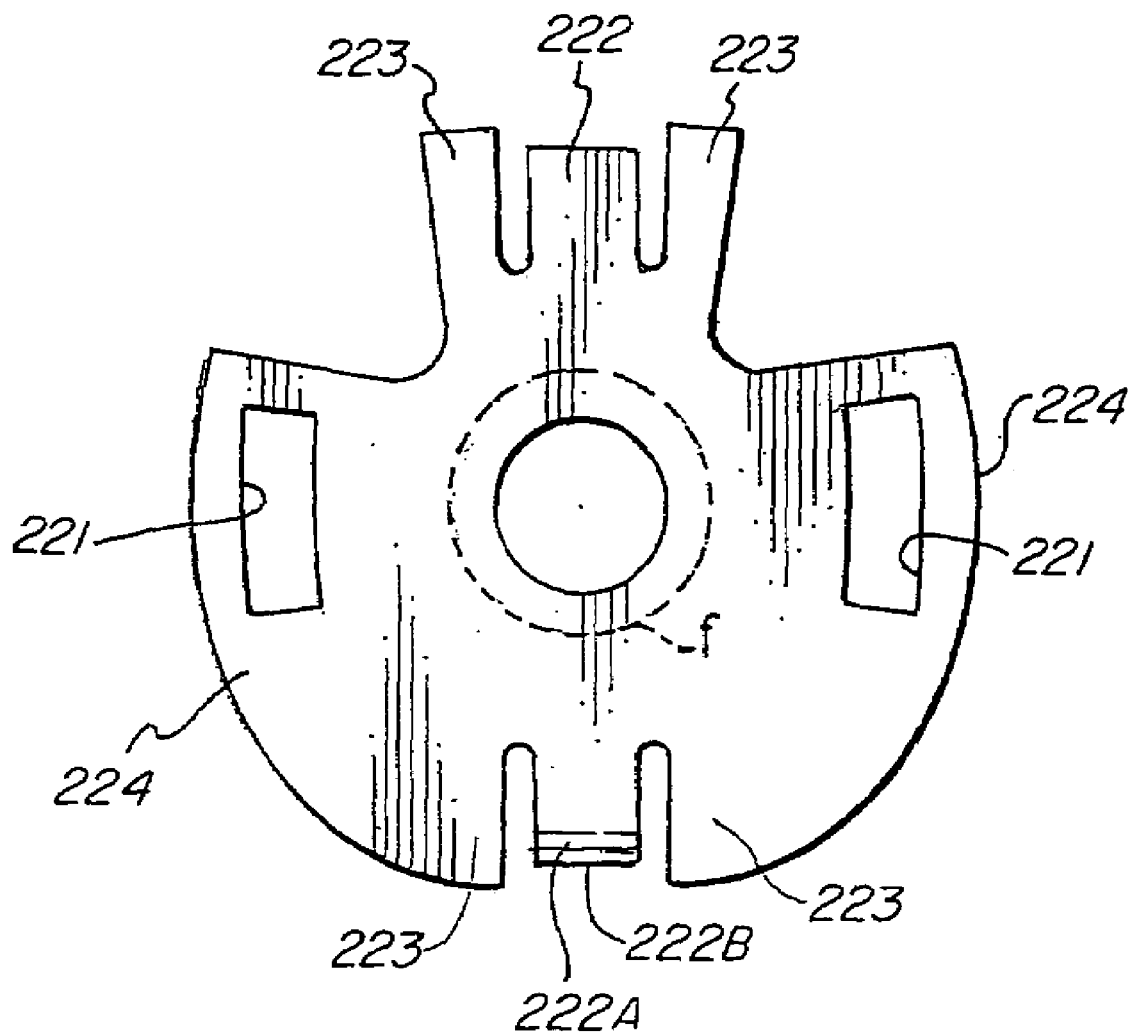
FIG. 66 is a plan view of a modified blank for forming a frustro-conical snap fit retaining ring.

FIGS. 60 to 66 illustrate a further embodiment of the invention. As best seen in FIGS. 61 and 62, the connector assembly 200 comprises a connector body 201 and a modified outer frustro-conical retainer ring 202 as described in a co-pending application Ser. No. 11/364,435 filed Feb. 28, 2006, for Snap Fit Electrical Connector Assembly For Facilitating The Electric Connector Assembly To An Electric Box, which is incorporated by reference herein.

While the embodiment of the connector assembly 200 of FIGS. 60–66 is illustrated without any electrical conductor retaining means associated with the inlet end portion 201A of the connector body 201, it will be understood that the inlet end portion 201A may be fitted with any of the wire conductor retainer means as are described and illustrated herein, the descriptions of which need not be repeated.

Figure 67:
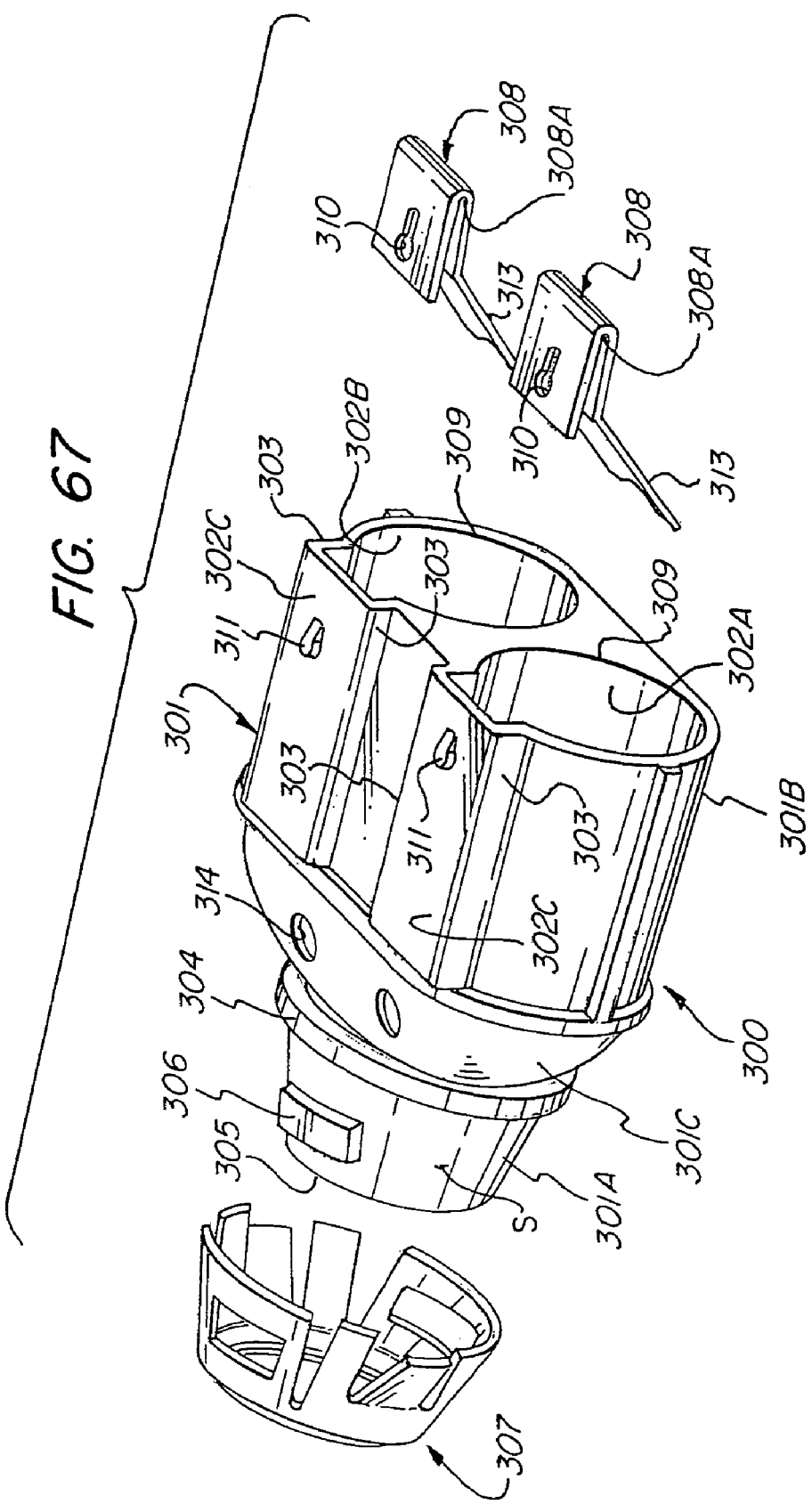
FIG. 67 is an exploded perspective view of still another modification of the invention.
Figure 68:
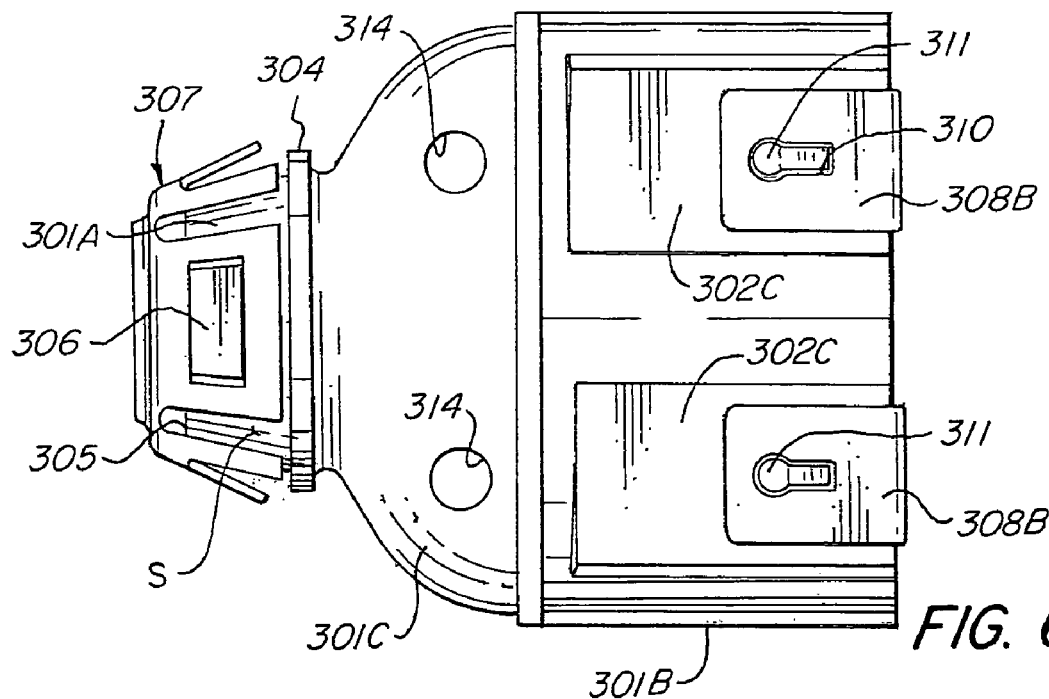
FIG. 68 is a top plan view of the embodiment of FIG. 67.
Figure 69:
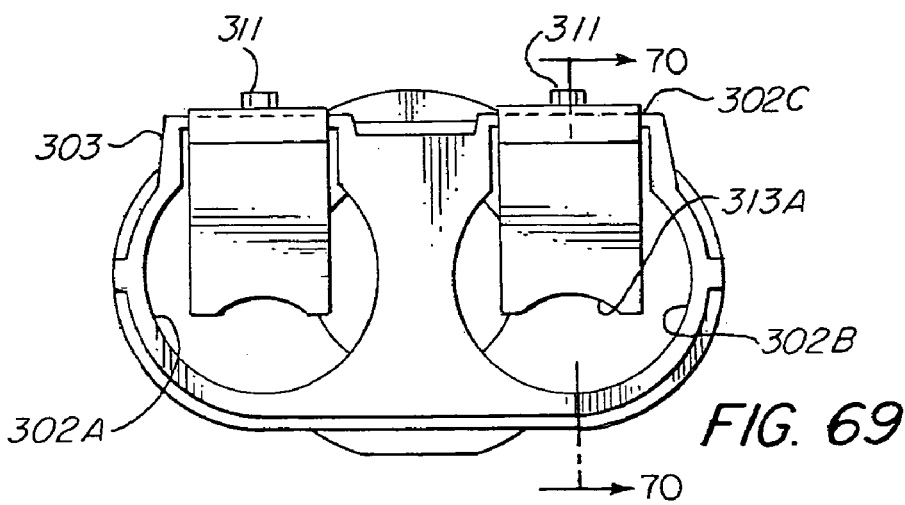
FIG. 69 is a right end view of FIG. 68.
Figure 70:
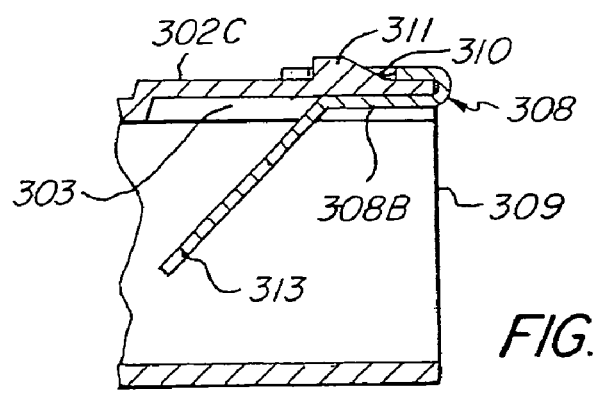
FIG. 70 is a sectional view taken along line 70—70 on FIG. 69.
Figure 71:
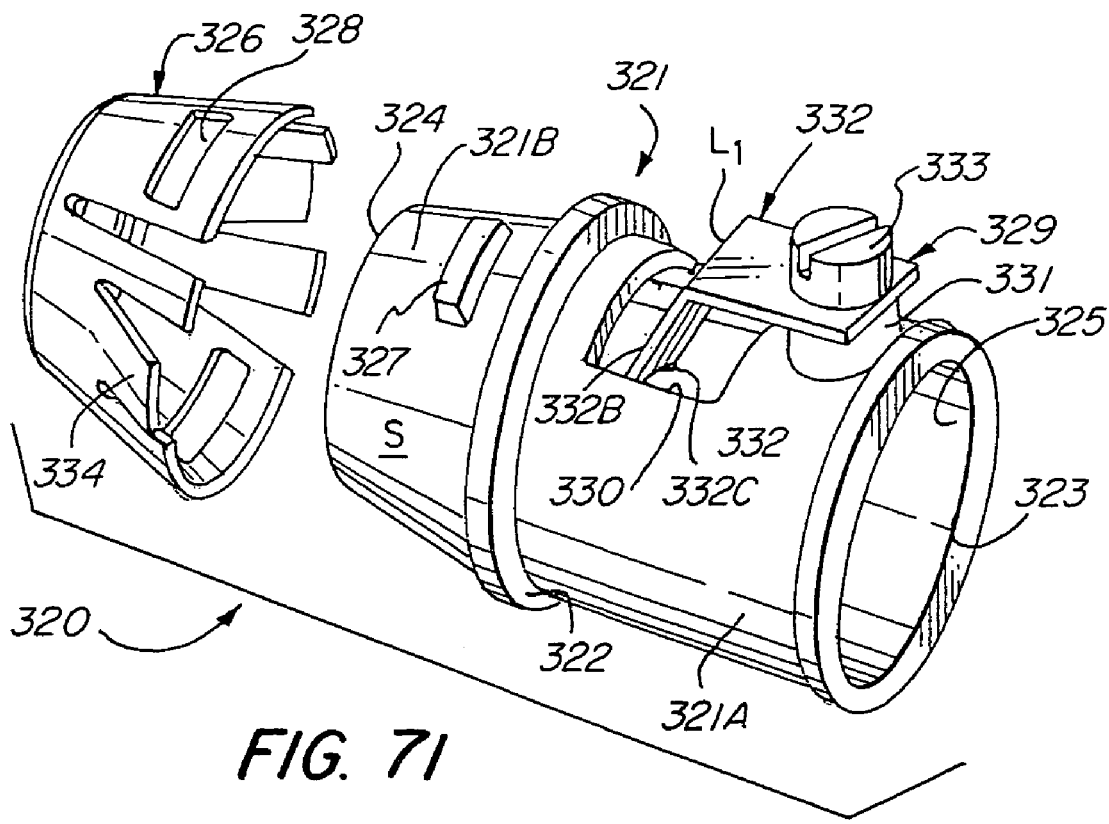
FIG. 71 is a perspective of a partially exploded view of another embodiment of the disclosed invention.
Figure 72:
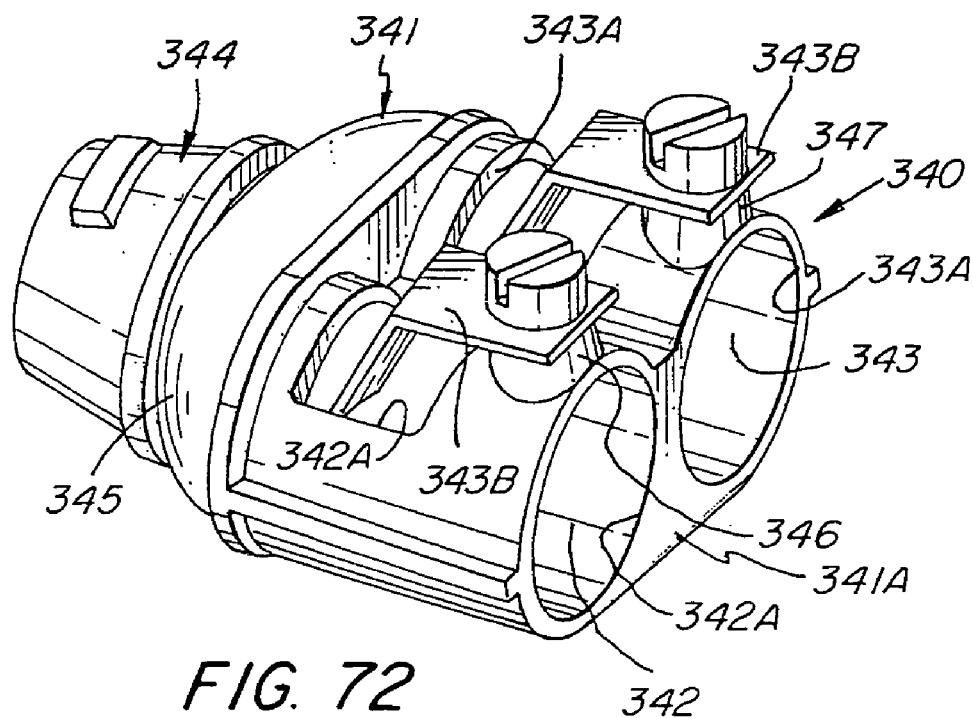
FIG. 72 is a perspective view of another modified form of the disclosed invention illustrated without the outer retainer ring.
Figure 73:
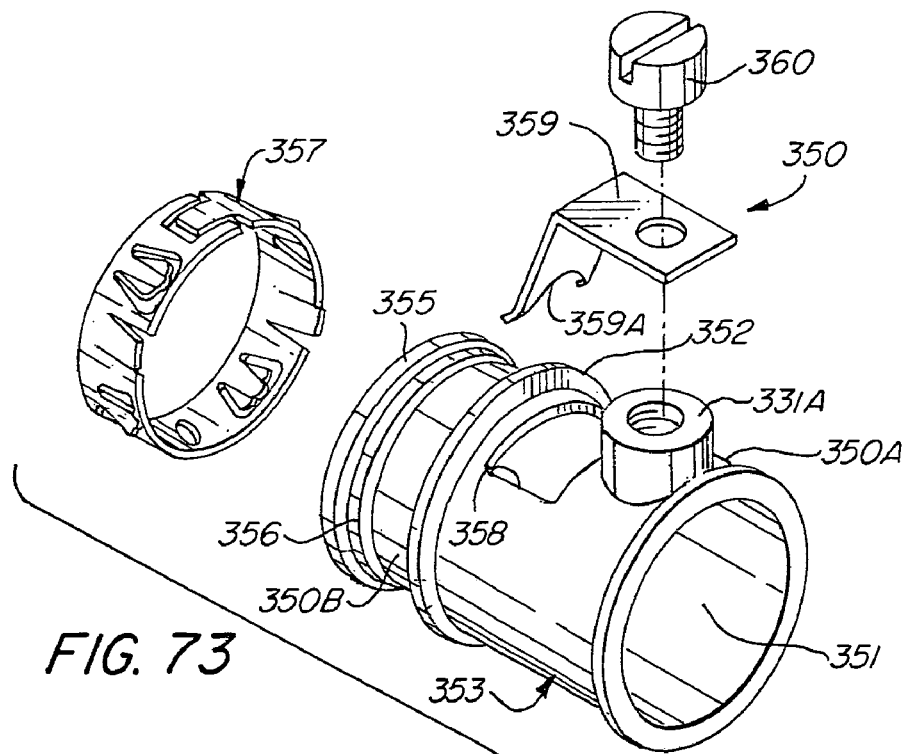
FIG. 73 is a perspective exploded view of a further embodiment of the invention.
Figure 74:
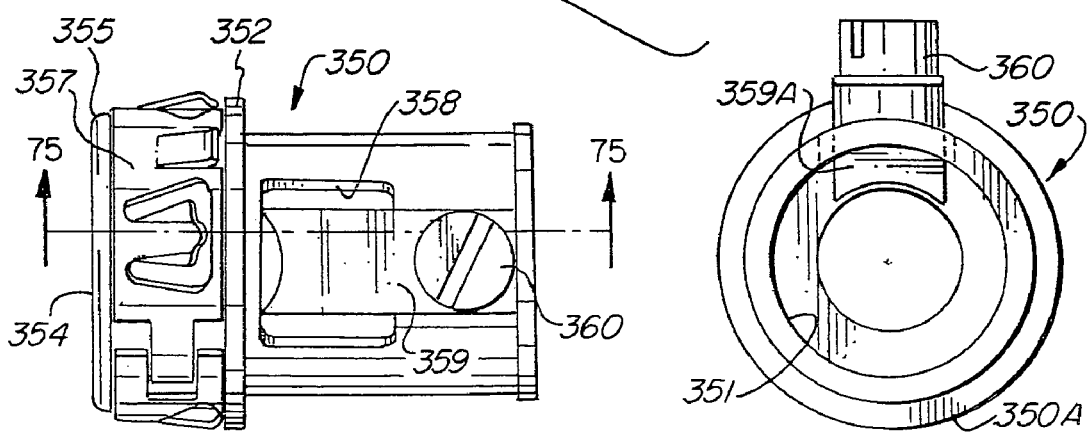
FIG. 74 is a side assembled view of FIG. 73.
Figure 76:
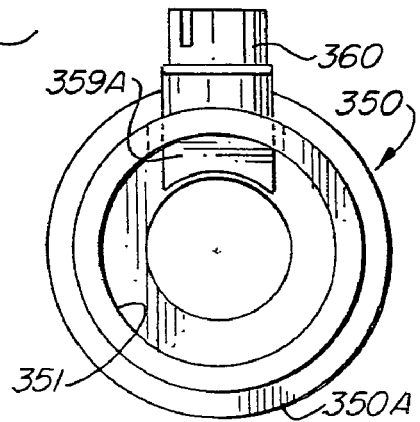
FIG. 76 is a right end view of FIG. 74.
Figure 75:
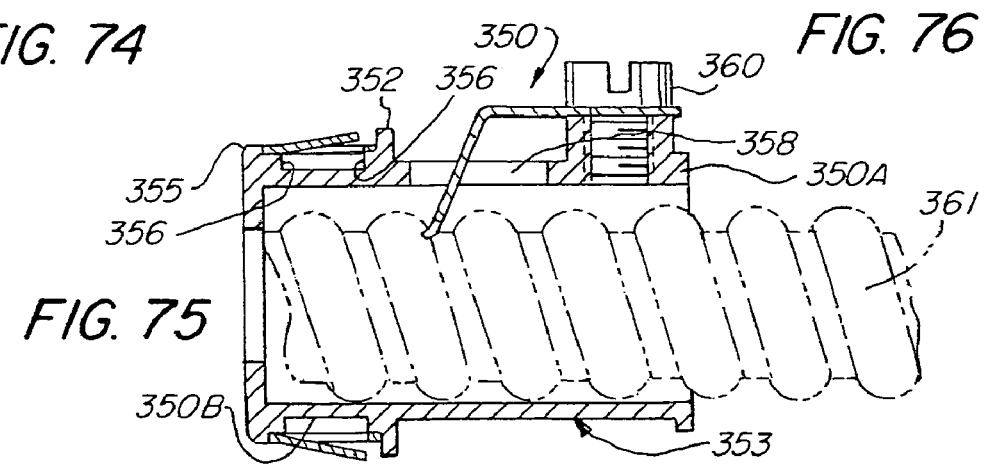
FIG. 75 is a side sectional view taken essentially along line 75—75 of FIG. 74.
Figure 77:
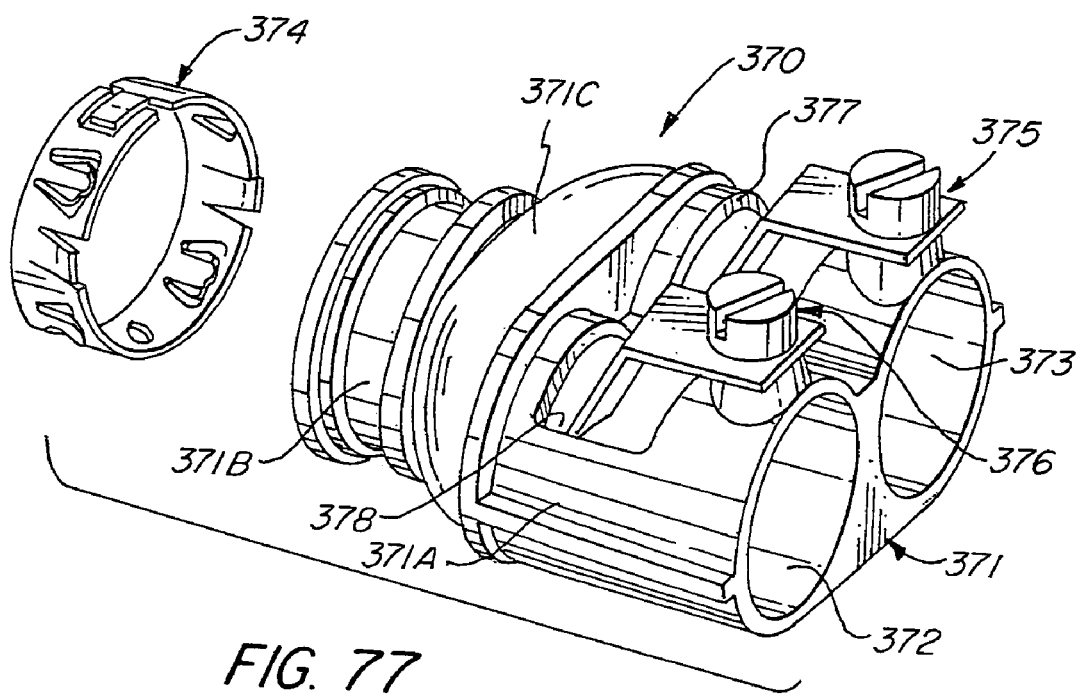
FIG. 77 is a perspective exploded view of a modified form of the invention.
Figure 78:
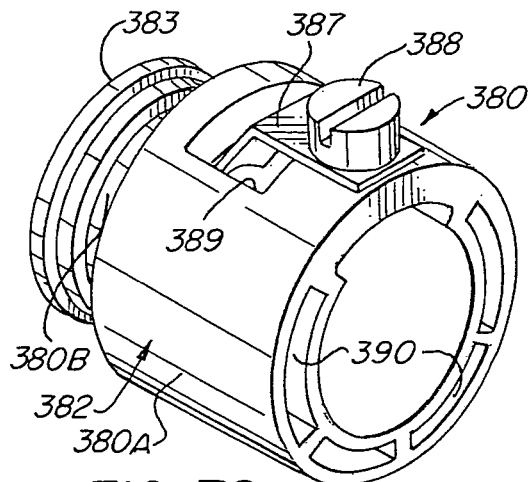
FIG. 78 is a perspective view of another embodiment of the invention.
Figure 79:
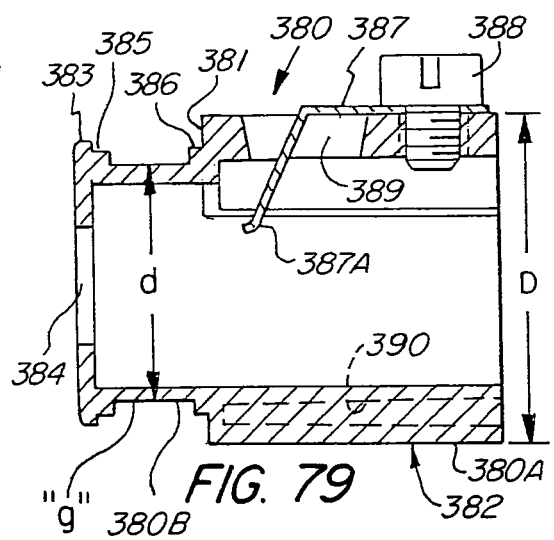
FIG. 79 is a cross sectional view of FIG. 78.
Figure 80:
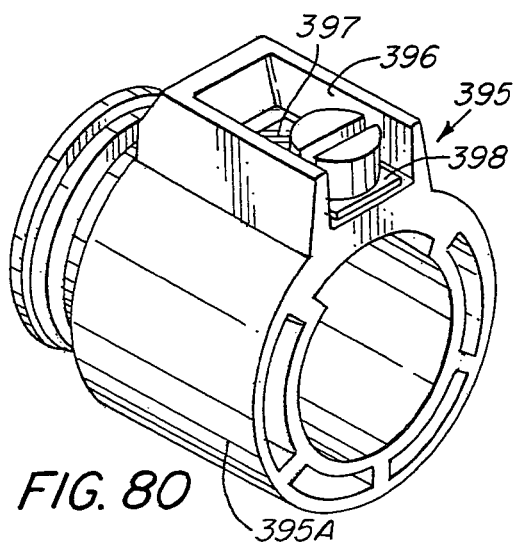
FIG. 80 is a perspective view of another modified embodiment.
Figure 81:
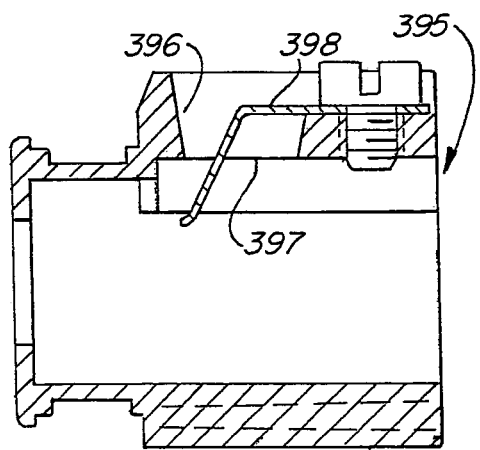
FIG. 81 is a cross sectional view of FIG. 80.
Figure 82:
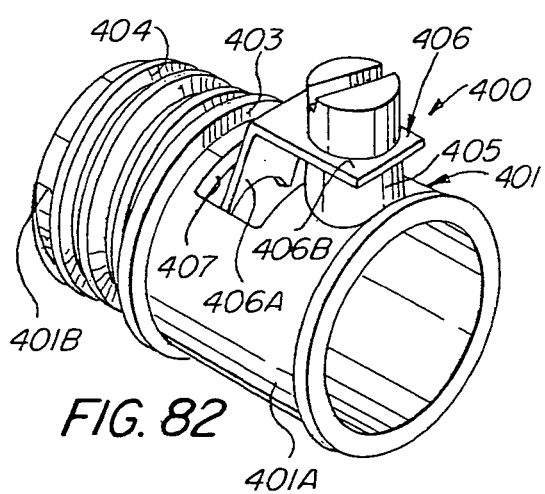
FIG. 82 is a perspective view of another modified embodiment.
Figure 83:
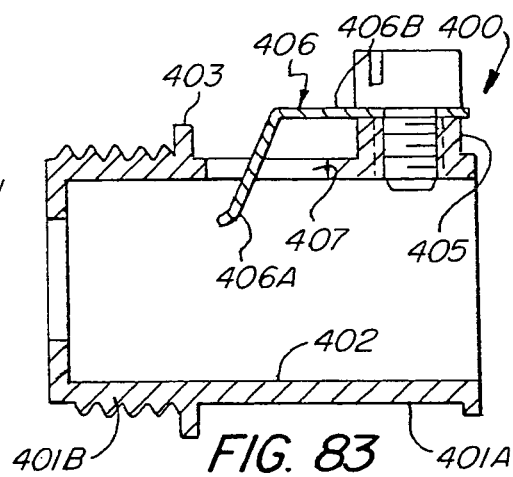
FIG. 83 is a cross sectional view of FIG. 82.

FIGS. 67 to 70 illustrate a further embodiment of the invention. The connector assembly 300, as illustrated in FIGS. 67 and 68, includes a connector body 301 formed as a unitary casting of any suitable metal or alloy, e.g. zinc and the like. The form of the casting is somewhat similar to that shown in FIG. 20. The embodiment of FIG. 67 differs from that of FIG. 20 in that connector body 301 is formed as a unitary casting rather than as separable parts as illustrated in FIG. 20. A more detailed description of the embodiment of FIGS. 67 to 70 is set forth in application Ser. No. 11/403,009 filed Apr. 12, 2006, for Snap Fit Electrical Connector Assembly With Frustro-Conical Retainer Ring And Internal Unidirectional Snap Fit Wire Conductor Retainer, which is incorporated by reference herein.

FIGS. 71–83 illustrate further modified embodiments of the invention which is disclosed in the co-pending application Ser. No. 11/501,131 filed Aug. 8, 2006 for Electrical Connector With Outer Retainer Ring And Unidirectional Conductor Retainer, which is also incorporated by reference herein, and need not be repeated herein.

FIGS. 84 to 89 illustrate a further embodiment of the invention. The electrical connector assembly 500 disclosed in FIGS. 84 to 89 are particularly useful in connecting flexible conduits that shield or direct wire conductors, cables and the like to an electric box or enclosures 501. As shown, the electrical connector assembly 500 includes a connector body 502, which may be described as an elbow having an outlet end portion 502A and an inlet end portion 502B that are angularly disposed relative to one another and having a bore B extending therethrough. In the illustrated embodiment, the outlet end portion 502A and the inlet end portion 502B are disposed at a 90° angle relative to one another. However, it will be understood that the angle formed by the axises of the outlet end portion and inlet end portion is not crucial. The angle between the outlet and inlet end portions may define any other suitable angles such as 45° angle, 60° angle, or other suitable angular standard as practiced in the electrical arts. The connector body 502 is preferably formed as a metal casting which may comprise zinc, aluminum or such other material that would satisfy any code requirements as practiced within the electrical industry.

Circumscribing the outlet end portion 502A is a radially outwardly extending flange 503 to function as a stop to limit the amount that the connector body may be inserted through a knock-out hole of an electric box or enclosure 501. The inlet end portion 502B is also provided with a stop flange 505 that limits the amount of the connector body that may be inserted into a flexible conduit 506, as will be hereinafter described.

As hereinbefore described, the outer surface "S" of the outlet portion 502A slopes downwardly toward the outlet opening 507 defined by the outlet end portion 502A. Formed on the sloping surface S are opposed retaining lugs 504, similar to that hereinbefore described. Circumscribing the outlet end portion 502A is a frustro-conical retainer ring 508, which is similar in structure to that described with respect to FIGS. 2 to 6, which need not be repeated herein.

The inlet end portion 502B has a generally circular outer surface provided with one or more circumferentially spaced, longitudinally extending external ribs, protrusions, or slightly raised linear surface 509. Press-fitted or frictionally-fitted in the inlet end portion 502B is a wire or electrical conductor retainer 510. The wire or conductor retainer 510 is in the form of a sleeve 511 formed of spring metal and having a generally circular surface, a portion of which comprises a flattened portion 511A, similar to that hereinbefore described. Blanked out of the surface of the retaining sleeve 511 are oppositely disposed wire retaining tangs 512. In all other respects, the wire retainer sleeve 511 is constructed similar to that hereinbefore described with respect to FIGS. 13 to 18, and which need not be repeated. The arrangement is such that the wire retainer sleeve 511 is force fitted or press fitted to the interior surface of the inlet end portion 502B. The frustro-conical wire retainer ring 508 is fitted onto the outer sloping surface S of the outlet end portion 502A and is retained thereon by the inter-engaging of the retaining lugs 504 within the slots 513 of the external frustro-conical retainer ring 508, similar to that hereinbefore described.

In operation, the external frustro-conical retaining or locking ring 508 is readily snap fitted onto the sloping complementary surface S of the outlet end portion 502A, and is retained thereon by the inter-engagement of the retainer lugs 504 engaging the retaining slots 513 of the external frustro-conical retaining ring 508. The wire retainer sleeve 511 is pressed or force fitted in the inlet end portion 502B. The arrangement is such that the inlet end portion 502B can readily be secured to a flexible conduit 506 as noted in FIGS. 88, 89 with a frictional fit so that the conductors, wires or cables directed through the flexible conduit 506 can be unidirected from the inlet end portion and through the outlet end portion 502A in a manner whereby the wire conductor or cable cannot be unintentionally separated form the inlet end portion 502B. The arrangement is such that the outlet end portion 502B can be readily snap fitted to a knock-out hole simply by a snap fit, and without the use of any hand tools. The electrical connector assembly 500 as described herein simplifies the fabrication of the connector body by eliminating the requirement of a cover plate or other clamping means for securing a cable or conductor to the inlet end portion and/or to a flexible conduit, as was hereinbefore customary.

From the foregoing, it will be apparent that the principle components described herein, viz. the external frustro-conical retainer rings, the connector bodies and the differently described wire conductor retainers, are rendered readily interchangeable with respect to the complementary components of the other embodiments described herein.

While the present invention has been described with respect to several embodiments, it will be understood that various modifications may be made without departing from the spirit or scope of the invention.

What is claimed is:

1. An electric connector assembly comprising:
   a connector body having an inlet end portion and an outlet end portion, and having a bore extending therethrough,
   said outlet end portion defining an outlet opening, and said inlet end portion defining an inlet opening,
   a radially outwardly extending stop flange circumscribing said connector body at said inlet and outlet end portions respectively,
   an outer retaining ring circumscribing said outlet end portion,
   said outer retaining ring having a frustro-conical configuration,
   means for retaining said outer retainer ring on said outlet end portion, said means includes a retaining lug,
   said retaining ring including locking tangs circumferentially spaced about the outer surface of said retaining ring,
   said locking tangs being blanked and cantilverely bent out of the surface of said outer retaining ring whereby the free ends of said locking tangs are directed toward said stop flange circumscribing said outlet end portion,
   and conductor retaining means disposed within said inlet end portion for effecting unidirectional insertion of an electrical conductor into said inlet end portion that prohibits any unintentional separation of an electrical conductor from said inlet end portion.

2. An electrical connector assembly as defined in claim 1 wherein said outlet end portion includes an outer surface that slopes downwardly toward said outlet opening, and
   said outer retainer ring having a leading end, a trailing end and an intermediate sloping surface therebetween forming said frustro-conical configuration complementing said outer sloping surface of said outlet end portion wherein the diameter of said trailing end of said frustro-conical configuration is greater than the diameter of said leading end of said outer retainer ring.

3. An electrical connector assembly as defined in claim 1 wherein said inlet end portion is adapted to be press fitted onto a flexible conduit.

4. A connector assembly as defined in claim 1 wherein said means for retaining said outer retainer ring includes:
   said retaining lug extending a radially outwardly on said outlet end portion, and
   said outer retainer ring circumscribing said outlet end portion having a slot formed thereon for engagingly receiving said retaining lug.

5. A connected assembly as defined in claim 4 wherein said outlet end portion is angularly disposed relating to said inlet end portion.

6. A connector assembly as defined in claim 5 wherein the angle formed between said inlet end portion and outlet end portion is approximately 90°.

7. A connector assembly for connection to a knock out hole of an electric box comprising:
   a connector body having an outlet end portion and an inlet end portion,
   a radially outwardly extending stop flange circumscribing said connector body between said outlet end portion and inlet end portion,
   said outlet end portion defining an outlet opening,
   said inlet end portion defining an inlet opening,
   said connector body having a bore extended therethrough for connecting said inlet opening to said outlet opening whereby said inlet opening is angularly disposed relative to said outlet opening, an outer retaining ring circumscribing said outlet end portion, means for retaining said outer retaining ring on said outlet end portion, said means includes a retaining lug, conductor retaining means for effecting unidirectional insertion of an electrical conductor into said inlet end portion, said conductor retaining means including a sleeve disposed within said inlet end portion, wire conductor retaining tangs blanked out of the surface of said sleeve, said tangs being inwardly bent relative to the surface of said sleeve, said sleeve being force fitted within said inlet end portion.

8. An electric connector assembly as defined in claim 7 wherein said inlet end portion includes a longitudinally outwardly extending ribs circumferentially spaced about said inlet end portion, and a flexible conduit frictionally secured to said let end portion.

9. An electric connector assembly as defined in claim 8 and including a second outwardly extending stop flange circumscribing said inlet end portion for limiting the insertion of said inlet end portion into said flexible conduit.

* * * * *